United States Patent
Ramasubramonian et al.

(10) Patent No.: US 11,395,014 B2
(45) Date of Patent: Jul. 19, 2022

(54) TRANSFORM UNIT DESIGN FOR VIDEO CODING

(71) Applicant: QUALCOMM Incorporated, San Diego, CA (US)

(72) Inventors: Adarsh Krishnan Ramasubramonian, Irvine, CA (US); Geert Van der Auwera, Del Mar, CA (US); Vadim Seregin, San Diego, CA (US); Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/024,422

(22) Filed: Sep. 17, 2020

(65) Prior Publication Data
US 2021/0084343 A1    Mar. 18, 2021

Related U.S. Application Data

(60) Provisional application No. 62/905,721, filed on Sep. 25, 2019, provisional application No. 62/902,234, filed on Sep. 18, 2019.

(51) Int. Cl.
*H04N 19/96*  (2014.01)
*H04N 19/186* (2014.01)
*H04N 19/70*  (2014.01)

(52) U.S. Cl.
CPC ........... *H04N 19/96* (2014.11); *H04N 19/186* (2014.11); *H04N 19/70* (2014.11)

(58) Field of Classification Search
CPC .... H04N 19/176; H04N 19/70; H04N 19/186; H04N 19/96; H04N 19/119
See application file for complete search history.

(56) References Cited

U.S. PATENT DOCUMENTS

2020/0260070 A1* 8/2020 Yoo ................ H04N 19/103
2020/0260096 A1* 8/2020 Ikai ................ H04N 19/176
(Continued)

FOREIGN PATENT DOCUMENTS

KR    20210057189 A  *  5/2021
WO    WO-2020250599 A1 * 12/2020

OTHER PUBLICATIONS

International Search Report and Written Opinion—PCT/US2020/051490—ISA/EPO—dated Nov. 13, 2020.
(Continued)

*Primary Examiner* — Robert J Hance
(74) *Attorney, Agent, or Firm* — Shumaker & Sieffert, P.A.

(57) ABSTRACT

An example device includes a memory and one or more processors. The one or more processors are configured to determine whether a first coding tree unit (CTU) is coded using single tree and based on the first CTU being coded using single tree, determine a first transform unit (TU) based on a first transform block (TB) of luma samples and a first two corresponding TBs of chroma samples. The one or more processors are also configured to determine whether a second CTU is coded using dual tree and based on the second CTU being coded using dual tree, determine a second TU based on either (i) a second TB of luma samples or (ii) a second two TBs of chroma samples. The first TU includes syntax structures used to transform first TB samples and the second TU includes syntax structures used to transform second TB samples.

30 Claims, 7 Drawing Sheets

(56) References Cited

U.S. PATENT DOCUMENTS

| | | | |
|---|---|---|---|
| 2020/0396467 A1* | 12/2020 | Lai | H04N 19/103 |
| 2021/0084343 A1* | 3/2021 | Ramasubramonian | H04N 19/119 |
| 2021/0218968 A1* | 7/2021 | Chernyak | H04N 19/186 |
| 2021/0266581 A1* | 8/2021 | Jung | H04N 19/60 |

OTHER PUBLICATIONS

Bross B., et al., "Versatile Video Coding (Draft 10)", JVET-S2001-vE, Joint Video Experts Team (JVET) of ITU-T SG 16 WP 3 and ISO/IEC JTC 1/SC 29/WG 11, 19th Meeting: by Teleconference, Jun. 22-Jul. 1, 2020, 544 Pages.

Chernyak R., et al., "Delta QP and Chroma QP Offset for Separate Tree", JVET-L0428-v1, Joint Video Experts Team (JVET) of ITU-T SG 16 WP 3 and ISO/IEC JTC 1/SC 29/WG 11, 12th Meeting: Macao, CN, Oct. 3-12, 2018, 5 pages.

Bross B., et al., "Versatile Video Coding (Draft 10)", JVET-S2001-vA, Joint Video Experts Team (JVET) of ITU-T SG 16 WP 3 and ISO/IEC JTC 1/SC 29/WG 11, 19th Meeting: by Teleconference, Jun. 22-Jul. 1, 2020, 550 Pages.

Bross B., et al., "Versatile Video Coding (Draft 6)", 127. MPEG and 15th JVET Meeting, Jul. 3, 2019-Jul. 12, 2019, Gothenburg, (Motion Picture Expert Group or JVET of ISO/IEC JTC1/SC29/WG11 and ITU-T SG 16 WP 3), No. m49908, JVET-O2001-vE, Jul. 15, 2019 (Jul. 15, 2019), XP030208562, 455 Pages, Retrieved from the Internet: URL: http://phenix.int-evry.fr/mpeg/doc_end_user/documents/127_Gothenburg/wg11/m49908-JVET-O2001-v8-JVET-O2001-v8.zip JVET-O2001-v8.docx [retrieved on Jul. 15, 2019].

Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), URL: http://phendx.int-evry.fr/jveti, No. JVET-A1001, Feb. 24, 2016 (Feb. 24, 2016), XP030150000, 27 Pages.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Lin, Z.-Y., et al., "CE3-2.1.1 and CE3-2.1.2: Removing 2×2, 2×4, and 4×2 Chroma CBs", JVET-O0050-v2, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-5.

Ramasubramonian A.K., et al., "On Chroma CBFs and Transform Units", JVET-P0360-v1, Joint Video Experts Learn (JVET) of ITU-T SG 16 WP 3 and ISO/IEC JTC 1/SC 29/WG 11, 16th Meeting, Geneva, CH, Oct. 1-11, 2019, pp. 1-8.

* cited by examiner

TRANSFORM UNIT DESIGN FOR VIDEO CODING

This application claims priority to U.S. Provisional Application No. 62/902,234, filed Sep. 18, 2019, and to U.S. Provisional Application No. 62/905,721, filed Sep. 25, 2019, the entire content of both of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by Motion Picture Experts Group (MPEG)-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for transform unit design and quantization parameter (QP) derivation for luma and chroma components for video coding. A video decoder may be configured in a manner that may not decode video data properly due to the video decoder being unable to determine what is included in a transform unit or whether to use actual values of some syntax elements or infer the values of the syntax elements. According to the techniques of this disclosure, a video decoder may be configured in a manner that is consistent with the configuration of a video encoder, such that the video decoder may be able to determine what is included in a transform unit or whether to use actual values of syntax elements or infer the values of the syntax elements.

In one example, a method includes determining, by one or more processors, whether a first coding tree unit (CTU) is coded using single tree; determining, by one or more processors and based on the first CTU being coded using single tree, a first transform unit (TU) based on a first set of first transform block (TB) samples comprising a first TB of luma samples and a first two corresponding TBs of chroma samples; coding a coding unit (CU) of the first CTU based on the first TU; determining, by the one or more processors, whether a second CTU is coded using dual tree; determining, by one or more processors and based on the second CTU being coded using dual tree, a second TU based on a second set of TB samples comprising either (i) a second TB of luma samples or (ii) a second two TBs of chroma samples; and coding a CU of the second CTU based on the second TU, wherein the first TU comprises syntax structures used to transform the first set of TB samples and the second TU comprises syntax structures used to transform the second set of TB samples.

In another example, a device includes a memory configured to store the video data, and one or more processors implemented in circuitry and communicatively coupled to the memory, the one or more processors being configured to: determine whether a first CTU is coded using single tree; determine, based on the first CTU being coded using single tree, a first TU based on a first set of TB samples comprising a first TB of luma samples and a first two corresponding TBs of chroma samples; code a CU of the first CTU based on the first TU; determine whether a second CTU is coded using dual tree; determine, based on the second CTU being coded using dual tree, a second TU based on a second set of TB samples comprising either (i) a second TB of luma samples or (ii) a second two TBs of chroma samples; and code a CU of the second CTU based on the second TU, wherein the first TU comprises syntax structures used to transform the first set of TB samples and the second TU comprises syntax structures used to transform the second set of TB samples.

In another example, a non-transitory computer-readable storage medium has instructions stored thereon which, when executed by one or more processors, cause the one or more processors to: determine whether a first CTU is coded using single tree; determine, based on the first CTU being coded using single tree, a first TU based on a first set of TB samples comprising a first TB of luma samples and a first two corresponding TBs of chroma samples; code a CU of the first CTU based on the first TU; determine whether a second CTU is coded using dual tree; determine, based on the second CTU being coded using dual tree, a second TU based on a second set of TB samples comprising either (i) a second TB of luma samples or (ii) a second two TBs of chroma samples; and code a CU of the second CTU based on the second TU, wherein the first TU comprises syntax structures used to transform the first set of TB samples and the second TU comprises syntax structures used to transform the second set of TB samples.

In another example, a device includes means for means for determining whether a first CTU is coded using single tree; means for determining, based on the first CTU being coded using single tree, a first TU based on a first set of TB samples comprising a first TB of luma samples and a first two corresponding TBs of chroma samples; means for coding a CU of the first CTU based on the first TU; means for determining whether a second CTU is coded using dual tree; means for determining, based on the second CTU being coded using dual tree, a second TU based on a second set of TB samples comprising either (i) a second TB of luma samples or (ii) a second two TBs of chroma samples; and means for coding a CU of the second CTU based on the second TU, wherein the first TU comprises syntax structures used to transform the first set of TB samples and the second TU comprises syntax structures used to transform the second set of TB samples.

The details of one or more examples are set forth in the accompanying drawings and the description below. Other features, objects, and advantages will be apparent from the description, drawings, and claims.

DETAILED DESCRIPTION

In certain video codec implementations, a video decoder may be configured in a manner that may not decode video data properly in certain situations. For example, a video decoder may be unable to determine what is included in a transform unit or whether to use the actual values of transform unit syntax elements, such as tu_cbf_cb and tu_cbf_cr (which may not yet be available) or to use inferred values when parsing a luma tree. As such, a video decoder may decode video data in a manner not intended by a video encoder and the video decoder may improperly decode video data which may result in defects in a visual rendering of the video data.

According to the techniques of this disclosure, a video decoder may be configured in a manner that is consistent with the configuration of a video encoder, facilitating the proper decoding of video data. For example, the video decoder may properly determine what is included in a transform unit and determine whether to use the actual values of transform unit syntax elements, such as tu_cbf_cb and tu_cbf_cr (which may not yet be available) or to use inferred values when parsing a luma tree. In this manner, a video decoder may more accurately decode encoded video data, resulting in better visual rendering with fewer defects.

Figure 1:
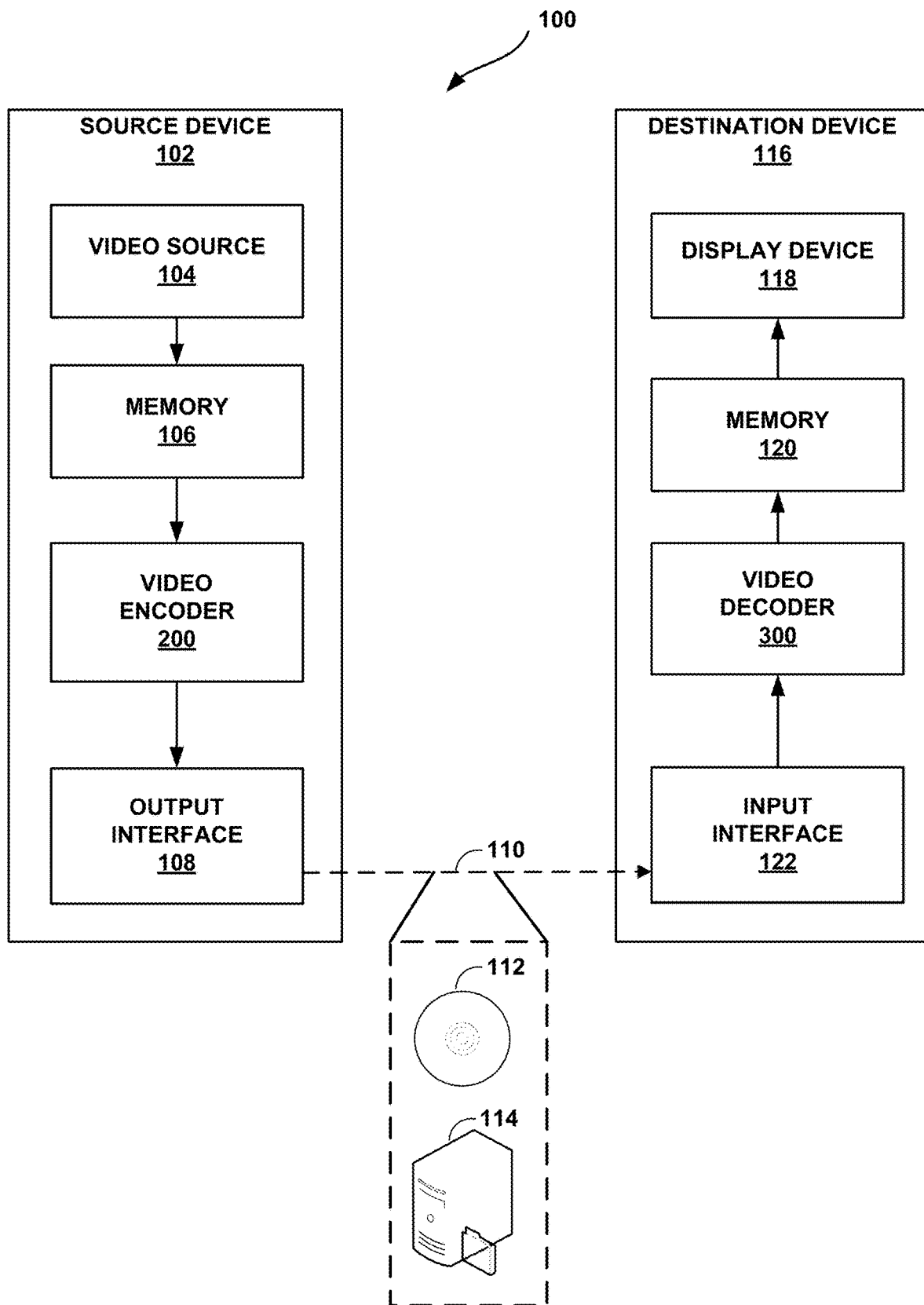
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, video encoding and decoding system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for transform unit design and quantization parameter (QP) derivation for luma and chroma. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

Video encoding and decoding system 100 as shown in FIG. 1 is merely one example. In general, any digital video encoding and/or decoding device may perform techniques for transform unit design and QP derivation for luma and chroma. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, video encoding and decoding system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data.

Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memory 106 and memory 120 may store raw video data, e.g., raw video from video source 104 and raw, decoded video data from video decoder 300. Additionally or alternatively, memory 106 and memory 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memory 106 and memory 120 may store encoded video data, e.g., output from video encoder 200 and input to video decoder 300. In some examples, portions of memory 106 and memory 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-O2001-vE (hereinafter "VVC Draft 6"). A more recent draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 19th Meeting: by teleconference, 22 Jun.-1 Jul. 2020, JVET-S2001-vA (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes.

Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, as will be explained in more detail below, a method includes determining, by one or more processors, whether a first CTU is coded using single tree; determining, by one or more processors and based on the first CTU being coded using single tree, a first TU based on a first set of TB samples comprising a first TB of luma samples and a first two corresponding TBs of chroma samples; coding a CU of the first CTU based on the first TU; determining, by the one or more processors, whether a second CTU is coded using dual tree; determining, by one or more processors and based on the second CTU being coded using dual tree, a second TU based on a second set of TB samples comprising either (i) a second TB of luma samples or (ii) a second two TBs of chroma samples; and coding a CU of the second CTU based on the second TU, wherein the first TU comprises syntax structures used to transform the first set of TB samples and the second TU comprises syntax structures used to transform the second set of TB samples.

In accordance with other example techniques of this disclosure, a device includes a memory configured to store the video data, and one or more processors implemented in circuitry and communicatively coupled to the memory, the one or more processors being configured to: determine whether a first CTU is coded using single tree; determine, based on the first CTU being coded using single tree, a first TU based on a first set of TB samples comprising a first TB of luma samples and a first two corresponding TBs of chroma samples; code a CU of the first CTU based on the first TU; determine whether a second CTU is coded using dual tree; determine, based on the second CTU being coded using dual tree, a second TU based on a second set of TB samples comprising either (i) a second TB of luma samples or (ii) a second two TBs of chroma samples; and code a CU of the second CTU based on the second TU, wherein the first TU comprises syntax structures used to transform the first set of TB samples and the second TU comprises syntax structures used to transform the second set of TB samples.

In accordance with other example techniques of this disclosure, a non-transitory computer-readable storage medium has instructions stored thereon which, when executed by one or more processors, cause the one or more processors to: determine whether a first CTU is coded using single tree; determine, based on the first CTU being coded using single tree, a first TU based on a first set of TB samples comprising a first TB of luma samples and a first two corresponding TBs of chroma samples; code a CU of the first CTU based on the first TU; determine whether a second CTU is coded using dual tree; determine, based on the second CTU being coded using dual tree, a second TU based on a second set of TB samples comprising either (i) a second TB of luma samples or (ii) a second two TBs of chroma samples; and code a CU of the second CTU based on the second TU, wherein the first TU comprises syntax structures used to transform the first set of TB samples and the second TU comprises syntax structures used to transform the second set of TB samples.

In accordance with other example techniques of this disclosure, a device includes means for determining whether a first CTU is coded using single tree; means for determining, based on the first CTU being coded using single tree, a first TU based on a first set of TB samples comprising a first TB of luma samples and a first two corresponding TBs of chroma samples; means for coding a CU of the first CTU based on the first TU; means for determining whether a second CTU is coded using dual tree; means for determining, based on the second CTU being coded using dual tree, a second TU based on a second set of TB samples comprising either (i) a second TB of luma samples or (ii) a second two TBs of chroma samples; and means for coding a CU of the second CTU based on the second TU, wherein the first TU comprises syntax structures used to transform the first set of TB samples and the second TU comprises syntax structures used to transform the second set of TB samples.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
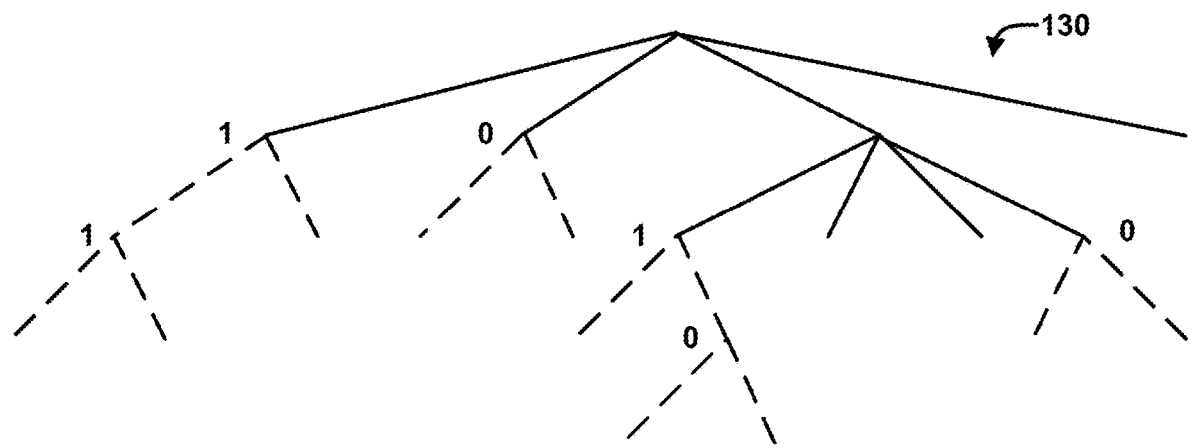
FIGS. 2A and 2B are conceptual diagrams illustrating an example quadtree binary tree (QTBT) structure, and a corresponding coding tree unit (CTU).
Figure 2B:
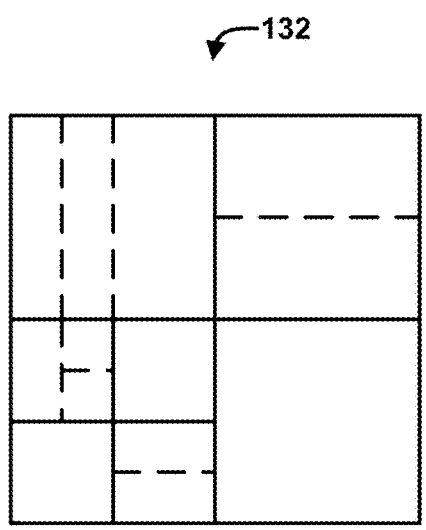

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
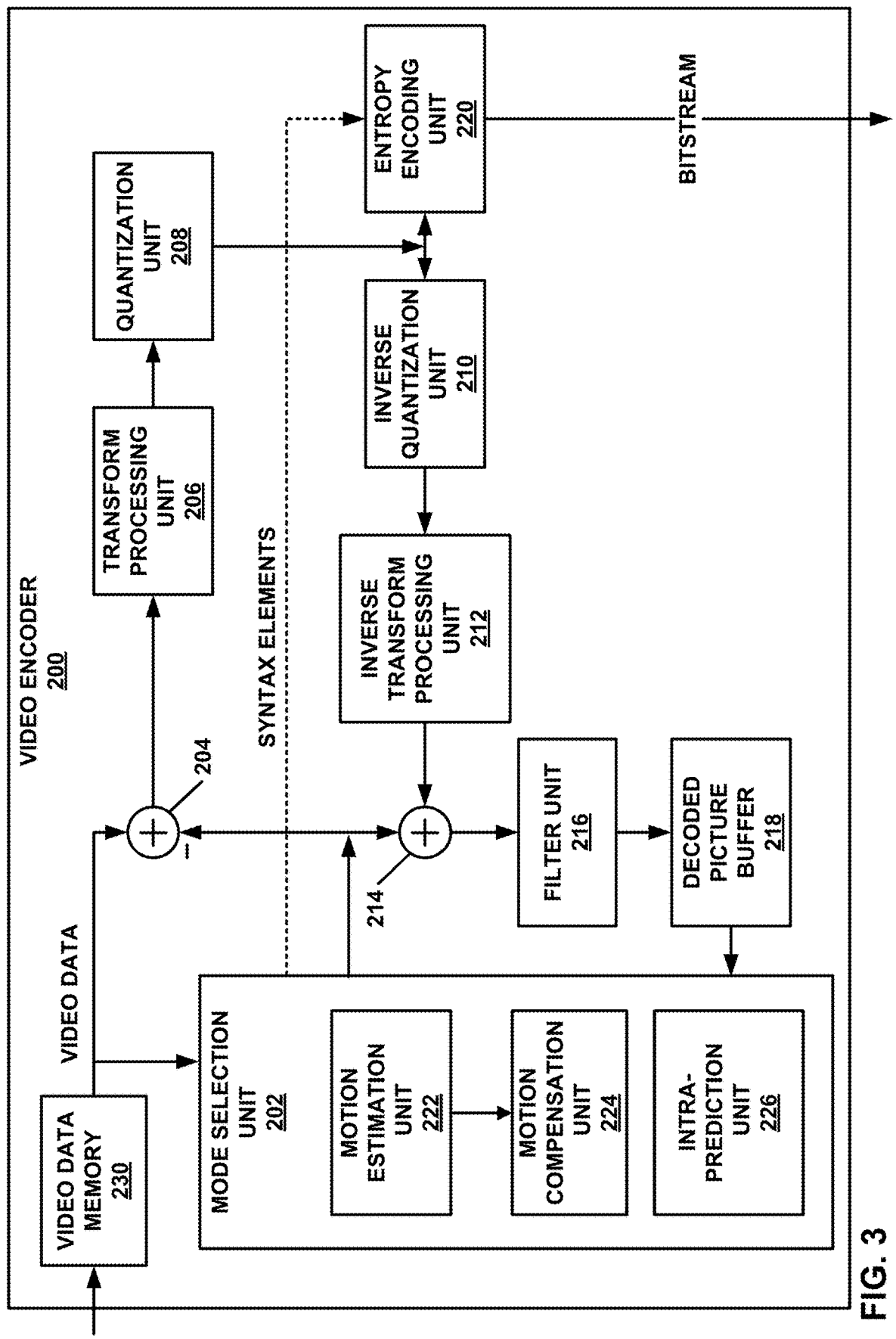
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

For example, transform processing unit 206 may determine whether a first CTU is coded using single tree. Transform processing unit 206 may determine, based on the first CTU being coded using single tree, a first TU based on a first TB of luma samples and a first two corresponding TBs of chroma samples. Additionally or alternatively, transform processing unit 206 may determine whether a second CTU is coded using dual tree. Transform processing unit 206 may determine, based on the second CTU being coded using dual tree, a second TU based on either (i) a second TB of luma samples or (ii) a second two TBs of chroma samples.

Quantization unit 208 may quantize the transform coefficients in a transform coefficient block, to produce a quantized transform coefficient block. Quantization unit 208 may quantize transform coefficients of a transform coefficient block according to a QP value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine whether a first CTU is coded using single tree; determine, based on the first CTU being coded using single tree, a first TU based on a first set of TB samples comprising a first TB of luma samples and a first two corresponding TBs of chroma samples; encode a CU of the first CTU based on the first TU; determine whether a second CTU is coded using dual tree; determine, based on the second CTU being coded using dual tree, a second TU based on a second set of TB samples comprising either (i) a second TB of luma samples or (ii) a second two TBs of chroma samples; and encode a CU of the second CTU based on the second TU, wherein the first TU comprises syntax structures used to transform the first set of TB samples and the second TU comprises syntax structures used to transform the second set of TB samples.

Figure 4:
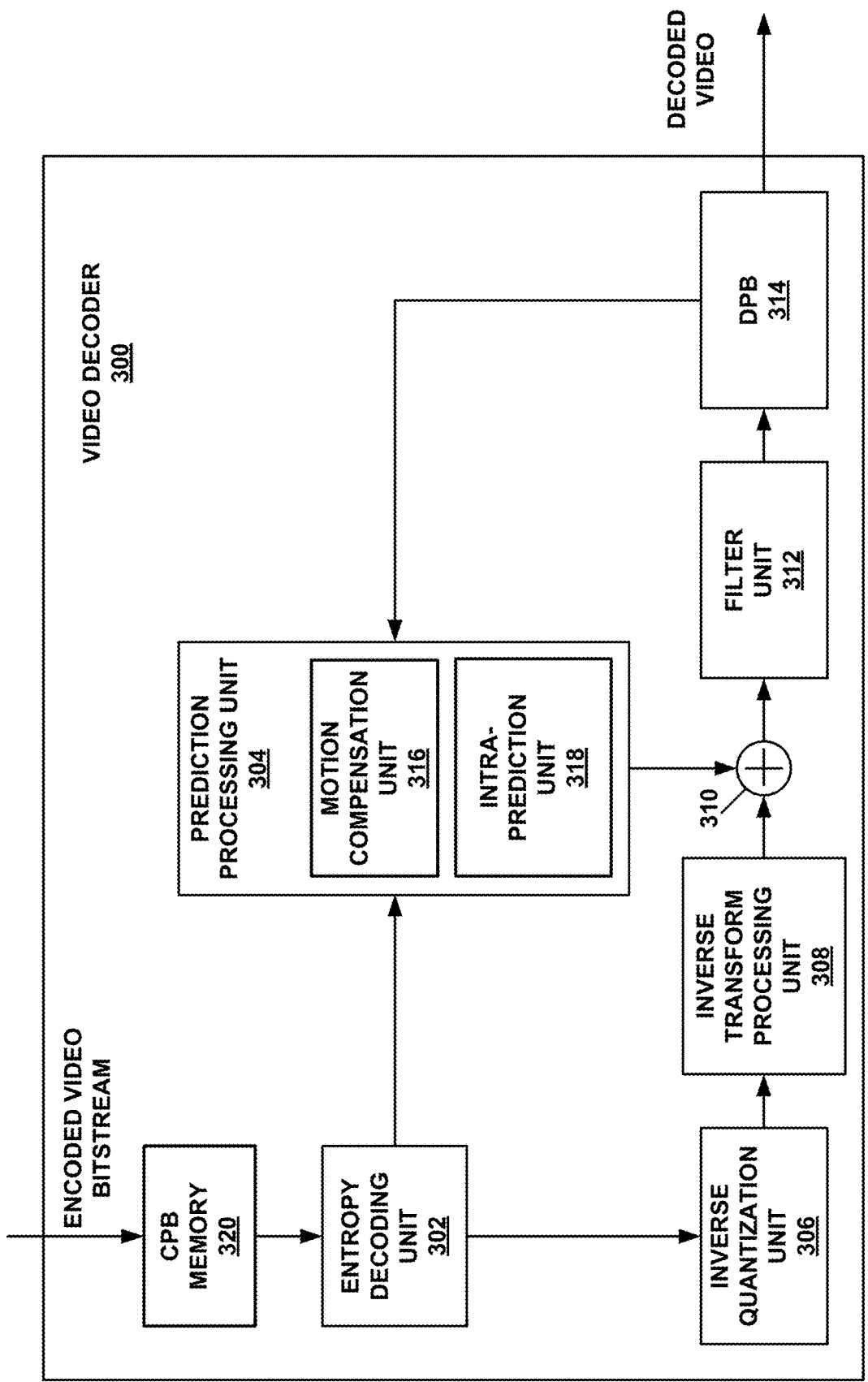
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a QP and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

For example, inverse transform processing unit 308 may determine whether a first CTU is coded using single tree. Inverse transform processing unit 308 may determine, based on the first CTU being coded using single tree, a first TU based on a first TB of luma samples and a first two corresponding TBs of chroma samples. Additionally, or alternatively, inverse transform processing unit 308 may determine whether a second CTU is coded using dual tree. Inverse transform processing unit 308 may determine, based on the second CTU being coded using dual tree, a second TU based on either (i) a second TB of luma samples or (ii) a second two TBs of chroma samples.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processors implemented in circuitry and configured to determine whether a first CTU is coded using single tree; determine, based on the first CTU being coded using single tree, a first TU based on a first set of TB samples comprising a first TB of luma samples and a first two corresponding TBs of chroma samples; decode a CU of the first CTU based on the first TU; determine whether a second CTU is coded using dual tree; determine, based on the second CTU being coded using dual tree, a second TU based on a second set of TB samples comprising either (i) a second TB of luma samples or (ii) a second two TBs of chroma samples; and decode a CU of the second CTU based on the second TU, wherein the first TU comprises syntax structures used to transform the first set of TB samples and the second TU comprises syntax structures used to transform the second set of TB samples.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. HEVC was finalized by the Joint Collaboration Team on Video Coding (JCT-VC) of ITU-T Video Coding Experts Group (VCEG) and ISO/IEC MPEG in April 2013.

The JVET, a collaborative team formed by MPEG and ITU-T Study Group 16's VCEG, is working on a new video coding standard to be known as VVC. The primary objective of VVC is to provide a significant improvement in compression performance over the existing HEVC standard, aiding in deployment of higher-quality video services and emerging applications such as 360° omnidirectional immersive multimedia and high-dynamic-range (HDR) video.

Video coders (e.g., video encoder 200 or video decoder 300) use QP values to determine the step size to be used for quantizing/inverse-quantizing the transform coefficients. In some examples, QP values are specified in the range of −QpBdOffset to 63, inclusive, where 63 is the maximum QP value. QpBdOffset is specified as fixed value for a particular bit depth, derived as 6*(bitDepth−8). The QP prime value, calculated by adding QpBdOffset to the specified QP value specified, is used to derive the actual step size. For ease of description, the QP and QP prime value may be used interchangeably in the rest of this disclosure with the understanding that only the QP value is used in most QP derivation processes, and the QP prime value is only used at the final stage just before determining the step size. A change of QP value by 1 roughly indicates a change in the step size by 12%; a change of QP value by 6 corresponds to changing the step size by a factor of 2. The higher the quantization parameter value, the larger the quantization step size and the more coarse the representation of the coefficients that are quantized becomes.

Quantization groups (QGs) are regions of a picture where a QP offset parameter may be signaled. This offset parameter, when signaled, is used to derive the QP values of one or more coding blocks in the quantization group. The offset parameter is often referred to as a delta QP value.

QGs may be signaled by video encoder 200, for example, by means of a maximum depth from the coding tree block (CTB) level or using a variable that is indicative of the number of samples of the group relative to the CTB size.

Note that, in some examples, the QP values for QGs are only signaled for the first block in the QG that has non-zero coefficients. For blocks in a QG that are before the first block with non-zero coefficients, the QP value may be derived to be a predicted QP value as described later in this disclosure. Blocks with zero coefficients do not need any QP value as there are no coefficients to be quantized/inverse-quantized. Instead, video decoder 300 may use the predicted QP value in the deblocking process in determining some parameters of deblocking filters to be applied. Typically, a QG refers to luma QG, where the luma QG is a region where the coding blocks have the same predicted QP value.

In VVC Draft 6, the following are the syntax elements that are relevant to the derivation of the QP parameters for luma and chroma by video encoder 200 and video decoder 300.

Sequence Parameter Set

TABLE 1

| min_qp_prime_ts_minus4 | ue(v) |
| --- | --- |

The syntax element min_qp_prime_ts_minus4 in Table 1 is used to derive the minimum QP value for the transform skip mode.

TABLE 2

| if( ChromaArrayType != 0 ) { | |
| --- | --- |
|   same_qp_table_for_chroma | u(1) |
|   for( i = 0; i < same_qp_table_for_chroma ? 1 : 3; i++ ) { | |
|     num_points_in_qp_table_minus1[ i ] | ue(v) |
|     for( j = 0; j <= num_points_in_qp_table_minus1[ i ]; j++ ) { | |
|       delta_qp_in_val_minus1[ i ][ j ] | ue(v) |
|       delta_qp_out_val[ i ][ j ] | ue(v) |
|     } | |
|   } | |
| } | |

The syntax elements above in Table 2 are used to specify the mapping table to derive a chroma QP value from a luma QP value for the Cb, Cr and joint Cb-Cr components.

TABLE 3

| sps_ladf_enabled_flag | u(1) |
| --- | --- |
| if ( sps_ladf_enabled_flag ) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |

The QP-value related syntax elements in the above Table 3 apply to luma adaptive QP offsets to be applied to a luma deblocking process.

Picture Parameter Set

TABLE 4

| init_qp_minus26 | se(v) |
| --- | --- |
| if( sps_transform_skip_enabled_flag ) | |
|   log2_transform_skip_max_size_minus2 | ue(v) |
| cu_qp_delta_enabled_flag | u(1) |
| if( cu_qp_delta_enabled_flag ) | |
|   cu_qp_delta_subdiv | ue(v) |
| pps_cb_qp_offset | se(v) |
| pps_cr_qp_offset | se(v) |
| pps_joint_cbcr_qp_offset | se(v) |
| pps_slice_chroma_qp_offsets_present_flag | u(1) |
| cu_chroma_qp_offset_enabled_flag | u(1) |
| if( cu_chroma_qp_offset_enabled_flag ) { | |
|   cu_chroma_qp_offset_subdiv | ue(v) |
|   chroma_qp_offset_list_len_minus1 | ue(v) |
|   for( i = 0; i <= chroma_qp_offset_list_len_minus1; i++ ) { | |
|     cb_qp_offset_list[ i ] | se(v) |
|     cr_qp_offset_list[ i ] | se(v) |
|     joint_cbcr_qp_offset_list[ i ] | se(v) |
|   } | |
| } | |

The syntax elements in Table 4 are used to derive an initial QP for slices that refer to the PPS; and specify the QGs for the luma and chroma, and a table of offset values to indicate CU chroma offsets.

Slice Header

TABLE 5

| slice_qp_delta | se(v) |
| --- | --- |
| if( pps_slice_chroma_qp_offsets_present_flag ) { | |
|   slice_cb_qp_offset | se(v) |
|   slice_cr_qp_offset | se(v) |
|   if( sps_joint_cbcr_enabled_flag ) | |
|     slice_joint_cbcr_qp_offset | se(v) |
| } | |

The syntax elements in Table 5 specify further deltas to the initial QP of the slices for both luma and chroma components.

Transform Unit Syntax

TABLE 6

| if( ( CbWidth[ chType ][ x0 ][ y0 ] > | | CbHeight[ chType ][ x0 ][ y0 ] > 64 | | |
| --- |
|   tu_cbf_luma[ x0 ][ y0 ] | | tu_cbf_cb[ x0 ][ y0 ] | | tu_cbf_cr[ x0 ][ y0 ] ) && |
|   treeType != DUAL_TREE_CHROMA ) { |
|   if( cu_qp_delta_enabled_flag && !IsCuQpDeltaCoded ) { |

TABLE 6-continued

```
    cu_qp_delta_abs                                                    ae(v)
    if( cu_qp_delta_abs )
      cu_qp_delta_sign_flag                                            ae(v)
  }
}
if( ( tu_cbf_cb[ x0 ][ y0 ] | | tu_cbf_cr[ x0 ][ y0 ] ) {
  if( cu_chroma_qp_offset_enabled_flag && !IsCuChromaQpOffsetCoded) {
    cu_chroma_qp_offset_flag                                           ae(v)
    if( cu_chroma_qp_offset_flag && chroma_qp_offset_list_len_minus1 > 0 )
      cu_chroma_qp_offset_idx                                          ae(v)
  }
}
```

The syntax elements of Table 6 specify the CU-level QP offsets for luma and chroma components that are used to derive the QP values for the QGs.

In VVC Draft 6, video encoder 200 or video decoder 300 may derive the QP value for luma and chroma as follows. For luma components, the slice QP may be derived from the initial QP (signaled in the PPS) and the QP offsets signaled in the slice. A QG is specified, and for each QP, a predicted QP, $QP_{Y\_PRED}$, is derived. Based on the relative location of the QG in the QG's brick and the QG's CTB row, the value of $QP_{Y\_PRED}$ may vary. The $QP_Y$ value is derived from $QP_{Y\_PRED}$ and the delta QP signaled for the QG.

It should be noted that $QP_{Y\_PRED}$ may be derived for all the coding blocks in a QG. However, delta QP is only signaled for blocks under certain conditions. Therefore, the QP values are only derived for certain cases.

The chroma QP is derived from a mapped value of the luma QP of the sample collocated with the center of the chroma block and any QP offset that may be applicable to the coding block. Similar to the luma QP offset, the chroma QP offset is signaled for the first chroma coding block in the chroma quantization group that has non-zero coefficients.

Video encoder 200 and video decoder 300 may follow the derivation process for QP values in VVC Draft 6, as follows. Inputs to the derivation process are: 1) a luma location (xCb, yCb) specifying the top-left luma sample of the current coding block relative to the top-left luma sample of the current picture; 2) a variable cbWidth specifying the width of the current coding block in luma samples; 3) a variable cbHeight specifying the height of the current coding block in luma samples; and 4) a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.

In this derivation process, the luma quantization parameter Qp'Y and the chroma quantization parameters Qp'Cb and Qp'Cr are derived.

The luma location (xQg, yQg), specifies the top-left luma sample of the current quantization group relative to the top left luma sample of the current picture. The horizontal and vertical positions xQg and yQg are set equal to CuQgTopLeftX and CuQgTopLeftY, respectively.

It should be noted that the current QG is a rectangular region inside a CTB that shares the same $qP_{Y\_PRED}$. The current QG's width and height are equal to the width and height of the coding tree node of which the top-left luma sample position is assigned to the variables CuQgTopLeftX and CuQgTopLeftY.

When treeType is equal to SINGLE_TREE or DUAL_TREE_LUMA, video decoder 300 may derive the predicted luma quantization parameter $qP_{Y\_PRED}$ by the following ordered steps. Step 1) The variable $qP_{Y\_PREV}$ is derived as follows: If one or more of the following conditions are true, $qP_{Y\_PREV}$ is set equal to SliceQp$_Y$: a) the current QG is the first QG in a slice; b) the current QG is the first QG in a brick; c) the current QG is the first QG in a CTB row of a brick and entropy_coding_sync_enabled_flag is equal to 1. Otherwise, $qP_{Y\_PREV}$ is set equal to the luma quantization parameter Qp$_Y$ of the last luma coding unit in the previous QG in decoding order.

Step 2) The derivation process for neighboring block availability as specified in clause 6.4.4 of VVC Draft 6 is invoked with the location (xCurr, yCurr) set equal to (xCb, yCb), the neighboring location (xNbY, yNbY) set equal to (xQg−1, yQg), checkPredModeY set equal to FALSE, and cIdx set equal to 0 as inputs, and the output is assigned to availableA. The variable $qP_{Y\_A}$ is derived as follows: If one or more of the following conditions are true, $qP_{Y\_A}$ is set equal to $qP_{Y\_PREV}$: availableA is equal to FALSE; or the CTB containing the luma coding block covering the luma location (xQg−1, yQg) is not equal to the CTB containing the current luma coding block at (xCb, yCb), e.g., all of the following conditions are true: (xQg−1)>>CtbLog2SizeY is not equal to (xCb)>>CtbLog2SizeY and (yQg)>>CtbLog2SizeY is not equal to (yCb)>>CtbLog2SizeY. Otherwise, $qP_{Y\_A}$ is set equal to the luma quantization parameter Qp$_Y$ of the coding unit containing the luma coding block covering (xQg−1, yQg).

Step 3) The derivation process for neighboring block availability as specified in clause 6.4.4 of VVC Draft 6 is invoked with the location (xCurr, yCurr) set equal to (xCb, yCb), the neighboring location (xNbY, yNbY) set equal to (xQg, yQg−1), checkPredModeY set equal to FALSE, and cIdx set equal to 0 as inputs, and the output is assigned to availableB. The variable $qP_{Y\_B}$ is derived as follows: If one or more of the following conditions are true, $qP_{Y\_B}$ is set equal to $qP_{Y\_PREV}$: availableB is equal to FALSE; or the CTB containing the luma coding block covering the luma location (xQg, yQg−1) is not equal to the CTB containing the current luma coding block at (xCb, yCb), e.g., all of the following conditions are true: (xQg)>>CtbLog2SizeY is not equal to (xCb)>>CtbLog2SizeY and (yQg−1)>>CtbLog2SizeY is not equal to (yCb)>>CtbLog2SizeY. Otherwise, $qP_{Y\_B}$ is set equal to the luma quantization parameter Qp$_Y$ of the coding unit containing the luma coding block covering (xQg, yQg−1).

Step 4) The predicted luma quantization parameter $qP_{Y\_PRED}$ is derived as follows: If all the following conditions are true, then $qP_{Y\_PRED}$ is set equal to the luma quantization parameter Qp$_Y$ of the coding unit containing the luma coding block covering (xQg, yQg−1): availableB is equal to TRUE; and the current quantization group is the first quantization group in a CTB row within a brick and entropy_coding_sync_enabled_flag is equal to 0. Otherwise, $qP_{Y\_PRED}$ is derived as follows:

$$qP_{Y\_PRED}=(qP_{Y\_A}+qP_{Y\_B}+1)>>1 \qquad (8\text{-}932)$$

The variable $Qp_Y$ is derived as follows:

$$Qp_Y=((qP_{Y\_PRED}+CuQpDeltaVal+64+2*QpBdOffset_Y)\%(64+QpBdOffset_Y))-QpBdOffset_Y \qquad (8\text{-}933)$$

The luma quantization parameter Qp'y is derived as follows:

$$Qp'_Y = Qp_Y + QpBdOffset_Y \qquad (8\text{-}934)$$

When ChromaArrayType is not equal to 0 and treeType is equal to SINGLE_TREE or DUAL_TREE_CHROMA, the following applies: When treeType is equal to DUAL_TREE_CHROMA, the variable $Qp_Y$ is set equal to the luma quantization parameter $Qp_Y$ of the luma coding unit that covers the luma location (xCb+cbWidth/2, yCb+cbHeight/2). The variables $qP_{Cb}$, $qP_{Cr}$ and $qP_{CbCr}$ are derived as follows:

$$qPi_{Chroma}=Clip3(-QpBdOffset_C,63,Qp_Y) \qquad (8\text{-}935)$$

$$qPi_{Cb}=ChromaQpTable[0][qPi_{Chroma}] \qquad (8\text{-}936)$$

$$qPi_{Cr}=ChromaQpTable[1][qPi_{Chroma}] \qquad (8\text{-}937)$$

$$qPi_{CbCr}=ChromaQpTable[2][qPi_{Chroma}] \qquad (8\text{-}938)$$

The chroma quantization parameters for the Cb and Cr components, $Qp'_{Cb}$ and $Qp'_{Cr}$, and joint Cb-Cr coding $Qp'_{CbCr}$ are derived as follows:

$$Qp'_{Cb}=Clip3(-QpBdOffset_C,63,qP_{Cb}+pps\_cb\_qp\_offset+slice\_cb\_qp\_offset+CuQpOffset_{Cb})+QpBdOffset_C \qquad (8\text{-}939)$$

$$Qp'_{Cr}=Clip3(-QpBdOffset_C,63,qP_{Cr}+pps\_cr\_qp\_offset+slice\_cr\_qp\_offset+CuQpOffset_{Cr})+QpBdOffset_C \qquad (8\text{-}940)$$

$$Qp'_{CbCr}=Clip3(-QpBdOffset_C,63,qP_{CbCr}+pps\_cbcr\_qp\_offset+slice\_cbcr\_qp\_offset+CuQpOffset_{CbCr})+QpBdOffset_C \qquad 8\text{-}941)$$

VVC Draft 6 supports two ways of coding luma and chroma: single tree and dual tree. Under single tree, video encoder 200 and video decoder 300 code luma and chroma samples of each CTU in an interleaved fashion. Under dual-tree, video encoder 200 and video decoder 300 code luma and chroma samples of each CTU successively. The definition of transform unit in VVC Draft 6 is as follows: transform unit (TU): A transform block of luma samples and two corresponding transform blocks of chroma samples of a picture and syntax structures used to transform the transform block samples.

In the definition, the phrase "corresponding transform blocks of chroma" is used to indicate that the transform blocks (TBs) of luma and chroma of a TU cover the same region (even if the chroma TBs are of different sizes due to chroma sub sampling).

In dual tree cases, however, it is not easy to define a TU as one transform block of luma with two corresponding transform blocks of chroma. The decisions to split the luma samples and chroma samples in a CTU are separated in dual-tree. Therefore, one of the following scenarios may apply: one luma TB may correspond to two chroma TBs of each component (aligned with the definition); one luma TB may correspond to one chroma TB or more than two chroma TBs of each component; multiple luma TBs may correspond to one chroma block of each component; or there may be no such correspondence possible.

In such cases, a video decoder, such as video decoder 300, may be unable to determine what is included in a transform unit, which may result in the video decoder having potential problems in parsing of the syntax table and decoding the video data. Currently, in VVC Draft 6, one transform block is associated with a transform unit only under the following conditions: Monochrome picture (only one component); or separate_color_plane_flag is equal to 1.

The following examples illustrate the problems that may arise (sometimes partly) due to this ambiguity. Note that some examples below also apply to the single tree cases.

In one example, the semantics of tu_cbf_cr[ ] and tu_cbf_cb[ ] (these two syntax elements may be referred to herein as chroma CBF values) are inferred to be equal to 0 when the syntax elements are not present in the transform unit. If the TU contains both luma and chroma samples, and the slice is coded using the dual tree mode, the luma tree is first coded followed by the chroma tree. In this case, video decoder 300 may be unable to determine whether to use the actual values of the syntax elements tu_cbf_cb and tu_cbf_cr (which may not yet be available) or to use the inferred values when parsing the luma tree. This could result in improper decoding of the video data. The values of these syntax elements are used in the parsing of tu_cbf_luma (Note that there are also inference rules for tu_cbf_luma when tu_cbf_luma is not present in the current TU). Currently dual tree is only applied for the intra-coded slice, and in this case chroma CBF values are not used for parsing a luma CBF value.

In another example, signaling/parsing the delta QP value for luma depends on the tu_cbf_cb and tu_cbf_cr values. Similar to the earlier paragraph, for dual tree, video decoder 300 may be unable to determine whether to use the actual values of tu_cbf_cb and tu_cbf_cr (when available) or to use the inferred values.

In yet another example, in a single-tree coded slice, an intra sub-partitioning (ISP)-coded block may have N sub-partitions. The N luma TBs are coded first, followed by the chroma (e.g., ISP is only applied for luma). The syntax elements associated with the chroma block are coded with the last luma TB. In other words, the chroma CBF values are only signaled for the last intra sub-partition.

For non-ISP blocks, the delta QP value for luma is signaled for a luma TB when the chroma CBF value is non-zero. For the first N−1 luma sub-partitions, video decoder 300 may be unable to determine whether to use the actual values or the inferred values of chroma CBF in decoding the value of delta QP for luma. This is inconsistent with the design of the non-ISP blocks.

This disclosure describes several techniques to improve the chroma QP derivation for hybrid transform-based video codecs, such as a video codec implementing a version of VVC, including signaling. It should be understood that one or more of these techniques may be used independently, or in combination with other techniques.

Several potential definitions of a transform unit follow. According to the techniques of this disclosure, video encoder 200 and video decoder 300 may be configured to code video data, including TUs, in accordance with one or more of these definitions.

In one example, the transform unit may be defined as follows: transform unit (TU): A transform block of luma samples, and in some cases two corresponding transform blocks of chroma samples, of a picture and syntax structures used to transform the transform block samples.

In one example, the transform unit is defined as follows: transform unit (TU): One or more transform block and syntax structures used to transform the transform block of the following samples: In single tree, a transform block of luma samples and two corresponding transform blocks of chroma samples; and in dual tree, a transform block of luma samples or two corresponding transform blocks of chroma samples In another alternative, the transform unit is defined as follows: transform unit (TU): One or more transform block and syntax structures used to transform the transform block of the following samples: In single tree when ISP is not applied to the coding block containing the samples, a transform block of luma samples and two corresponding transform blocks of chroma samples; in single tree when ISP is applied to the coding block containing the samples, a transform block of luma samples for first N−1 luma transform blocks, and one luma transform block and two transform blocks of chroma samples, where the chroma samples may correspond to more than transform blocks in the coding block; and in dual tree, a transform block of luma samples or two corresponding transform blocks of chroma samples.

In another alternative, the transform unit is defined as follows: transform unit (TU): One transform block of luma samples, or a transform block of luma samples and two corresponding transform blocks of chroma samples of a picture when using single-tree coding mode, or one transform block of luma samples or two transform blocks of chroma samples when using dual-tree coding mode, and syntax structures used to transform the transform block samples.

For example, video encoder 200 or video decoder 300 may determine whether a first CTU is coded using single tree. Based on the first CTU being coded using single tree, video encoder 200 or video decoder 300 may determine a first TU based on a first set of TB samples, including a first TB of luma samples and a first two corresponding TBs of chroma samples and code a CU of the first CTU based on the first TU. Video encoder 200 or video decoder 300 may determine whether a second CTU is coded using dual tree. Based on the second CTU being coded using dual tree, video encoder 200 or video decoder 300 may determine a second TU based on a second set of TB samples including, either (i) a second TB of luma samples or (ii) a second two TBs of chroma samples and code a CU of the second CTU based on the second TU. In some examples, the first TU includes syntax structures used to transform first set of TB samples and the second TU includes syntax structures used to transform second set of TB samples.

It may be beneficial to avoid the dependence of delta QP signaling on the chroma CBF values. For example, for dual tree cases, video encoder 200 or video decoder 300 may be configured to determine delta QP values without reference to chroma CBF values. In other words, the delta QP values may not depend on chroma CBF values. In some cases, the dependence of signaling or parsing delta QP on the chroma CBF values may be removed for dual tree and single tree cases. In other examples, video encoder 200 or video decoder 300 may initialize the values of chroma CBF syntax elements to zero at the beginning of the luma tree in the dual tree case. For example, based on a CTU being coded using dual tree, video encoder 200 or video decoder 300 may initialize chroma CBF values to zero at a beginning of a luma tree.

In a single tree case, video encoder 200 may signal the tu_cbf values for chroma in ISP CUs along with the first luma sub-partition and signal the residual associated with the chroma also with the first sub-partition. In one example, although tu_cbf values for chroma are signaled in the first intra sub-partition, the residual may only be signaled with the last intra sub-partition. In some examples, chroma tools, where the chroma reconstruction is dependent on the reconstructed luma values (e.g., cross-component linear model (CCLM) prediction, reshaper, etc.), are disabled when ISP is enabled.

In some examples, video decoder 300 may not infer tu_cbf_cr or tu_cbr_cb to be equal to 0 when tu_cbf_cr or tu_cbr_cb are not present in the current TU.

One or more techniques disclosed in this disclosure may further be constrained by one or more characteristics of the samples on which the chroma mapping table is applied: e.g., block shape, aspect ratio, prediction mode used, characteristics of the neighboring block, location of the samples with respect to the picture (near the boundaries or away from the boundaries, including picture boundaries, tile boundaries, slice boundaries, brick boundaries, etc.).

Some techniques described above may be applied by a video encoder (e.g., video encoder 200) or a video decoder (e.g., video decoder 300), or both. Although many of the techniques disclosed are for chroma components, the techniques may also be applicable for luma and for components in other color spaces that may be used to represent the video. One or more techniques disclosed herein may be applied together or applied independently. Additionally, although one or more techniques described above may be described with respect to a particular type of block, it should be understood that these techniques apply to different types of blocks—coding blocks, prediction blocks, transform blocks or other types of blocks that specify some spatial partitioning of the picture.

In some examples, video encoder 200 and video decoder 300 may be configured to determine luma delta QP without reference to chroma CBF values. The following deletion shown between <DELETE> and </DELETE> in Table 7 may be made in the syntax and semantics of VVC Draft 6. In this example, the dependence of luma delta QP signaling on chroma CBF values is removed.

TABLE 7

|  | Descriptor |
| --- | --- |
| transform_unit( x0, y0, tbWidth, tbHeight, treeType, subTuIndex, chType ) { <br>   if( ( treeType = = SINGLE_TREE | | treeType = = DUAL_TREE_CHROMA ) && <br>     ChromaArrayType != 0 ) { <br>     if( ( IntraSubPartitionsSplitType = = ISP_NO_SPLIT && !( cu_sbt_flag && <br>       ( ( subTuIndex = = 0 && cu_sbt_pos_flag ) | | <br>         ( subTuIndex = = 1 && !cu_sbt_pos_flag ) ) ) ) | | <br>       ( IntraSubPartitionsSplitType != ISP_NO_SPLIT && <br>       ( subTuIndex = = NumIntraSubPartitions − 1 ) ) ) { |  |
|     tu_cbf_cb[ x0 ][ y0 ] | ae(v) |
|     tu_cbf_cr[ x0 ][ y0 ] | ae(v) |

TABLE 7-continued

| | Descriptor |
|---|---|
| ` }`<br>`}`<br>`if( treeType = = SINGLE_TREE || treeType = = DUAL_TREE_LUMA ) {`<br>`  if( ( IntraSubPartitionsSplitType = = ISP_NO_SPLIT && !( cu_sbt_flag &&`<br>`      ( ( subTuIndex = = 0 && cu_sbt_pos_flag ) ||`<br>`        ( subTuIndex = = 1 && !cu_sbt_pos_flag ) ) ) &&`<br>`      ( CuPredMode[ chType ][ x0 ][ y0 ] = = MODE_INTRA ||`<br>`        tu_cbf_cb[ x0 ][ y0 ] || tu_cbf_cr[ x0 ][ y0 ] ||`<br>`        CbWidth[ chType ][ x0 ][ y0 ] > MaxTbSizeY ||`<br>`        CbHeight[ chType ][ x0 ][ y0 ] > MaxTbSizeY ) ) ||`<br>`      ( IntraSubPartitionsSplitType != ISP_NO_SPLIT &&`<br>`      ( subTuIndex < NumIntraSubPartitions − 1 || !InferTuCbfLuma ) ) )`<br>`        tu_cbf_luma[ x0 ][ y0 ]` | |
| | ae(v) |
| `   if (IntraSubPartitionsSplitType != ISP_NO_SPLIT)`<br>`      InferTuCbfLuma = InferTuCbfLuma && !tu_cbf_luma[ x0 ][ y0 ]`<br>`}`<br>`if( IntraSubPartitionsSplitType != ISP_NO_SPLIT &&`<br>`  treeType = = SINGLE_TREE && subTuIndex = = NumIntraSubPartitions − 1 ) )`<br>`  xC = CbPosX[ chType ][ x0 ][ y0 ]`<br>`  yC = CbPosY[ chType ][ x0 ][ y0 ]`<br>`  wC = CbWidth[ chType ][ x0 ][ y0 ] / SubWidthC`<br>`  hC = CbHeight[ chType ][ x0 ][ y0 ] / SubHeightC`<br>`} else`<br>`  xC = x0`<br>`  yC = y0`<br>`  wC = tbWidth / Sub WidthC`<br>`  hC = tbHeight / SubHeightC`<br>`}`<br>`if( ( CbWidth[ chType ][ x0 ][ y0 ] > 64 || CbHeight[ chType ][ x0 ][ y0 ] > 64 ||`<br>`    tu_cbf_luma[ x0 ][ y0 ] <DELETE> || tu_cbf_cb[ x0 ][ y0 ] ||`<br>`tu_cbf_cr[ x0 ][ y0 ] </DELETE>) &&`<br>`    treeType != DUAL_TREE_CHROMA ) {`<br>`  if( cu_qp_delta_enabled_flag && !IsCuQpDeltaCoded ) {`<br>`    cu_qp_delta_abs` | |
| | ae(v) |
| `    if( cu_qp_delta_abs )`<br>`      cu_qp_delta_sign_flag` | ae(v) |
| `  }`<br>`}`<br>`if( ( tu_cbf_cb[ x0 ][ y0 ] || tu_cbf_cr[ x0 ][ y0 ] ) {`<br>`  if( cu_chroma_qp_offset_enabled_flag && !IsCuChromaQpOffsetCoded ) {`<br>`    cu_chroma_qp_offset_flag` | ae(v) |
| `    if( cu_chroma_qp_offset_flag && chroma_qp_offset_list_len_minus1 > 0 )`<br>`      cu_chroma_qp_offset_idx` | ae(v) |
| `  }`<br>`}`<br>`...` | |

In one example, video decoder 300 only applies the parsing of tu_cbf_cb and tu_cbf_cr for the single tree case. For example, video decoder 300 may determine whether a CTU is coded using single tree and, based on the CTU being coded using single tree, parse the chroma CBF values. Additions are shown between <ADD> and </ADD> in Table 8. The syntax structure may be as follows:

TABLE 8

| | Descriptor |
|---|---|
| `transform_unit( x0, y0, tbWidth, tbHeight, treeType, subTuIndex, chType ) {`<br>`  if( ( treeType = = SINGLE_TREE || treeType = = DUAL_TREE_CHROMA ) &&`<br>`      ChromaArrayType != 0 ) {`<br>`    if( ( IntraSubPartitionsSplitType = = ISP_NO_SPLIT && !( cu_sbt_flag &&`<br>`        ( ( subTuIndex = = 0 && cu_sbt_pos_flag ) ||`<br>`          ( subTuIndex = = 1 && !cu_sbt_pos_flag ) ) ) ) ||`<br>`        ( IntraSubPartitionsSplitType != ISP_NO_SPLIT &&`<br>`        ( subTuIndex = = NumIntraSubPartitions − 1 ) ) ) {`<br>`      tu_cbf_cb[ x0 ][ y0 ]` | ae(v) |
| `      tu_cbf_cr[ x0 ][ y0 ]` | ae(v) |
| `    }`<br>`  }`<br>`  if( treeType = = SINGLE_TREE || treeType = = DUAL_TREE_LUMA ) {`<br>`    if( ( IntraSubPartitionsSplitType = = ISP_NO_SPLIT && !( cu_sbt_flag &&`<br>`        ( ( subTuIndex = = 0 && cu_sbt_pos_flag ) ||` | |

TABLE 8-continued

| | Descriptor |
|---|---|
|     ( subTuIndex = = 1 \| \| && !cu_sbt_pos_flag ) ) ) &&<br>    ( CuPredMode[ chType ][ x0 ][ y0 ] = = MODE_INTRA \| \|<br>    tu_cbf_cb[ x0 ][ y0 ] \| \| tu_cbf_cr[ x0 ][ y0 ] \| \|<br>    CbWidth[ chType ][ x0 ][ y0 ] > MaxTbSizeY \| \|<br>    CbHeight[ chType ][ x0 ][ y0 ] > MaxTbSizeY ) ) \| \|<br>    ( IntraSubPartitionsSplitType != ISP_NO_SPLIT &&<br>    ( subTuIndex < NumIntraSubPartitions − 1 \| \| !InferTuCbfLuma ) ) )<br>    tu_cbf_luma[ x0 ][ y0 ]<br>  if (IntraSubPartitionsSplitType != ISP_NO_SPLIT )<br>    InferTuCbfLuma = InferTuCbfLuma && !tu_cbf_luma[ x0 ][ y0 ]<br>}<br>if( IntraSubPartitionsSplitType != ISP_NO_SPLIT &&<br>  treeType = = SINGLE_TREE && subTuIndex = = NumIntraSubPartitions − 1 ) )<br>  xC = CbPosX[ chType ][ x0 ][ y0 ]<br>  yC = CbPosY[ chType ][ x0 ][ y0 ]<br>  wC = CbWidth[ chType ][ x0 ][ y0 ] / Sub WidthC<br>  hC = CbHeight[ chType ][ x0 ][ y0 ] / SubHeightC<br>} else<br>  xC = x0<br>  yC = y0<br>  wC = tbWidth / SubWidthC<br>  hC = tbHeight / SubHeightC<br>}<br>if( ( CbWidth[ chType ][ x0 ][ y0 ] > 64 \| \| CbHeight[ chType ][ x0 ][ y0 ] > 64 \| \|<br>  tu_cbf_luma[ x0 ][ y0 ] \| \| <ADD> ( treeType = = SINGLE_TREE &&<br>(</ADD>tu_cbf_cb[ x0 ][ y0 ] \| \| tu_cbf_cr[ x0 ][ y0 ] <ADD> ] ) ) </ADD>) &&<br>  treeType != DUAL_TREE_CHROMA ) {<br>  if( cu_qp_delta_enabled_flag && !IsCuQpDeltaCoded ) {<br>    cu_qp_delta_abs<br>    if( cu_qp_delta_abs )<br>      cu_qp_delta_sign_flag<br>  }<br>}<br>if( ( tu_cbf_cb[ x0 ][ y0 ] \| \| tu_cbf_cr[ x0 ][ y0 ] ) {<br>  if( cu_chroma_qp_offset_enabled_flag && !IsCuChromaQpOffsetCoded) {<br>    cu_chroma_qp_offset_flag<br>    if( cu_chroma_qp_offset_flag && chroma_qp_offset_list_len_minus1 > 0 )<br>      cu_chroma_qp_offset_idx<br>  }<br>}<br>… | <br><br><br><br><br><br><br>ae(v)<br><br><br><br><br><br><br><br><br><br><br><br><br><br><br><br><br><br><br><br>ae(v)<br> <br>ae(v)<br><br><br><br>ae(v)<br><br>ae(v) |

In another example, video encoder 200 or video decoder 300 initialize the values of TuCbfCb and TuCbfCr to 0. The following changes may be made in the syntax and semantics of VVC Draft 6. Additions are shown between <ADD> and </ADD> and deletions are shown between <DELETE> and </DELETE> below. In addition, one or more occurrences of tu_cbf_cb and tu_cbf_cr in the syntax table, semantics and decoding process may be replaced by TuCbfCb and TuCbfCr. In some alternatives, the variables TuCbfCr and TuCbfCb may be initialized to 0 for all samples in the picture.

7.4.7.1 General Slice Header Semantics

When present, the value of each of the slice header syntax elements slice_pic_parameter_set_id, non_reference_picture_flag, color_plane_id, slice_pic_order_cnt_lsb, recovery_poc_cnt, no_output_of_prior_pics_flag, pic_output_flag, and slice_temporal_mvp_enabled_flag shall be the same in all slice headers of a coded picture.

The variable CuQpDeltaVal, specifying the difference between a luma quantization parameter for the coding unit containing cu_qp_delta_abs and its prediction, is set equal to 0. The variables $CuQpOffset_{Cb}$, $CuQpOffset_{Cr}$, and $CuQpOffset_{CbCr}$, specifying values to be used when determining the respective values of the $Qp'_{Cb}$, $Qp'_{Cr}$, and $Qp'_{CbCr}$ quantization parameters for the coding unit containing cu_chroma_qp_offset_flag, are all set equal to 0.

<ADD> The variable TuCbfCr and TuCbfCb specifying the coded block flag values for Cb and Cr components, respectively, for the transform unit are set equal to 0. </ADD> slice_pic_parameter_set_id specifies the value of pps_pic_parameteR_set_id for the PPS in use. The value of slice_pic_parameter_set_id shall be in the range of 0 to 63, inclusive.

7.4.9.10 Transform Unit Semantics

The transform coefficient levels are represented by the arrays TransCoeffLevel[x0][y0][cIdx][xC][yC]. The array indices x0, y0 specify the location (x0, y0) of the top-left luma sample of the considered transform block relative to the top-left luma sample of the picture. The array index cIdx specifies an indicator for the color component; it is equal to 0 for Y, 1 for Cb, and 2 for Cr. The array indices xC and yC specify the transform coefficient location (xC, yC) within the current transform block. When the value of TransCoeffLevel [x0][y0][cIdx][xC][yC] is not specified in clause 7.3.8.11, it is inferred to be equal to 0.

tu_cbf_cb[x0][y0] equal to 1 specifies that the Cb transform block contains one or more transform coefficient levels not equal to 0. The array indices x0, y0 specify the top-left location (x0, y0) of the considered transform block.

<DELETE> When tu_cbf_cb[x0][y0] is not present in the current TU, its value is inferred to be equal to 0. </DELETE>

<ADD> When tu_cbf_cb[x0][y0] is present, the variable TuCbfCb[x0][y0] is set equal to tu_cbf_cb[x0][y0]. </ADD> tu_cbf_cr[x0][y0] equal to 1 specifies that the Cr transform block contains one or more transform coefficient levels not equal to 0. The array indices x0, y0 specify the top-left location (x0, y0) of the considered transform block.

<DELETE> When tu_cbf_cr[x0][y0] is not present in the current TU, its value is inferred to be equal to 0. </DELETE>

<ADD> When tu_cbf_cr[x0][y0] is present, the variable TuCbfCr[x0][y0] is set equal to tu_cbf_cr[x0][y0]. </ADD> tu_cbf_luma[x0][y0] equal to 1 specifies that the luma transform block contains one or more transform coefficient levels not equal to 0. The array indices x0, y0 specify the location (x0, y0) of the top-left luma sample of the considered transform block relative to the top-left luma sample of the picture.

When tu_cbf_luma[x0][y0] is not present in the current TU, its value is inferred as follows:

. . .

In another example, video encoder 200 signals the values of tu_cbf_cb and tu_cbf_cr for ISP blocks in single tree in the first sub-partition rather than the last sub-partition and video decoder 300 parses the values of tu_cbf_cb and tu_cbf_cr for ISP blocks in single tree in the first sub-partition rather than the last sub-partition. The following changes may be made in the syntax and semantics of VVC Draft 6. Additions are shown between <ADD> and </ADD> in Table 9. Deletions are shown between <DELETE> and </DELETE> in Table 9.

TABLE 9

```
transform_unit( x0, y0, tbWidth, tbHeight, treeType, subTuIndex, chType ) {
<ADD> if( IntraSubPartitionsSplitType != ISP_NO_SPLIT &&
    treeType = = SINGLE_TREE && subTuIndex = = NumIntraSubPartitions - 1 ) )
  xC = CbPosX[ chType ][ x0 ][ y0 ]
  yC = CbPosY[ chType ][ x0 ][ y0 ]
  wC = CbWidth[ chType ][ x0 ][ y0 ] / SubWidthC
  hC = CbHeight[ chType ][ x0 ][ y0 ] / SubHeightC
} else
  xC = x0
  yC = y0
  wC = tbWidth / SubWidthC
  hC = tbHeight / SubHeightC
} </ADD>
if( ( treeType = = SINGLE_TREE | | treeType = = DUAL_TREE_CHROMA ) &&
    ChromaArrayType != 0 ) {
  if( ( IntraSubPartitionsSplitType = = ISP_NO_SPLIT && !( cu_sbt_flag &&
      ( ( subTuIndex = = 0 && cu_sbt_pos_flag ) | |
        (subTuIndex = = 1 && !cu_sbt_pos_flag ) ) ) | |
    ( IntraSubPartitionsSplitType != ISP_NO_SPLIT &&
      (subTuIndex = = <ADD> 0 </ADD> <DELETE> NumIntraSubPartitions - 1 ) ) ) {
    tu_cbf_cb[ x0 ][ y0 ][ xC ][ yC ]
    tu_cbf_cr[ x0 ][ y0 ][ xC ][ yC ] </DELETE>
  }
}
if( treeType = = SINGLE_TREE | | treeType = = DUAL_TREE_LUMA ) {
  if( ( IntraSubPartitionsSplitType = = ISP_NO_SPLIT && !( cu_sbt_flag &&
      ( ( subTuIndex = = 0 && cu_sbt_pos_flag ) | |
        (subTuIndex = = 1 && !cu_sbt_pos_flag ) ) ) &&
    ( CuPredMode[ chType ][ x0 ][ y0 ] = = MODE_INTRA | |
      tu_cbf_cb <DELETE> [ x0 ][ y0 ] </DELETE> <ADD> [ xC ][ yC ] </ADD> | |
tu_cbf_cr
<DELETE> [ x0 ][ y0 ] </DELETE> <ADD> [ xC ][ yC ] </ADD> | |
      CbWidth[ chType][ x0 ][ y0 ] > MaxTbSizeY | |
      CbHeight[ chType ][ x0 ][ y0 ] > MaxTbSizeY ) ) | |
    ( IntraSubPartitionsSplitType != ISP_NO_SPLIT &&
    ( subTuIndex < NumIntraSubPartitions - 1 | | !InferTuCbfLuma ) ) )
      tu_cbf_luma[ x0 ][ y0 ]
    if (IntraSubPartitionsSplitType != ISP_NO_SPLIT)
      InferTuCbfLuma = InferTuCbfLuma && !tu_cbf_luma[ x0 ][ y0 ]
  }
  <DELETE> if( IntraSubPartitionsSplitType != ISP_NO_SPLIT &&
    treeType = = SINGLE_TREE && subTuIndex = = NumIntraSubPartitions - 1 ) )
  xC = CbPosX[ chType ][ x0 ][ y0 ]
  yC = CbPosY[ chType ][ x0 ][ y0 ]
  wC = CbWidth[ chType ][ x0 ][ y0 ] / Sub WidthC
  hC = CbHeight[ chType ][ x0 ][ y0 ] / SubHeightC
} else
  xC = x0
  yC = y0
  wC = tbWidth / SubWidthC
  hC = tbHeight / SubHeightC
} </DELETE>
if( ( CbWidth[ chType ][ x0 ][ y0 ] > 64 | | CbHeight[ chType ][ x0 ][ y0 ] > 64 | |
  tu_cbf_luma[ x0 ][ y0 ] | | tu_cbf_cb <DELETE>[ x0 ][ y0 ] </DELETE> <ADD> [ xC ][ yC ]
</ADD>| | tu_cbf_cr <DELETE> [ x0 ][ y0 ] </DELETE> <ADD> [ xC ][ yC ] </ADD>) &&
    treeType != DUAL_TREE_CHROMA ) {
  if( cu_qp_delta_enabled_flag && !IsCuQpDeltaCoded ) {
    cu_qp_delta_abs
    if( cu_qp_delta_abs )
      cu_qp_delta_sign_flag
```

TABLE 9-continued

```
      }
    }
    if( ( (tu_cbf_cb <DELETE> [ x0 ][ y0 ] </DELETE> <ADD> [ xC ][ yC ] </ADD> | | tu_cbf_cr
<DELETE> [ x0 ][ y0 ] </DELETE> <ADD> [ xC ][ yC ] </ADD> ) {
      if( cu_chroma_qp_offset_enabled_flag && !IsCuChromaQpOffsetCoded) {
        cu_chroma_qp_offset_flag
        if( cu_chroma_qp_offset_flag && chroma_qp_offset_list_len_minus1 > 0 )
          cu_chroma_qp_offset_idx
      }
    }
    if( sps_joint_cbcr_enabled_flag && ( ( CuPredMode[ chType ][ x0 ][ y0 ] = = MODE_INTRA
        && (tu_cbf_cb <DELETE> [ x0 ][ y0 ] </DELETE> <ADD> [ xC ][ yC ] </ADD> | |
tu_cbf_cr<DELETE> [ x0 ][ y0 ]</DELETE> <ADD> [ xC ][ yC ] </ADD>) ) | |
        (tu_cbf_cb<DELETE> [ x0 ][ y0 ] </DELETE> <ADD> [ xC ][ yC ] </ADD> &&|
tu_cbf_cr<DELETE> [ x0 ][ y0 ] </DELETE> <ADD> [ xC ][ yC ] </ADD>) ) )
      tu_joint_cbcr_residual_flag[ x0 ][ y0 ]
    if( tu_cbf_luma[ x0 ][ y0 ] && treeType != DUAL_TREE_CHROMA
        && ( tbWidth <= 32 ) && ( tbHeight <= 32 )
        && ( IntraSubPartitionsSplit[ x0 ][ y0 ] = = ISP_NO_SPLIT ) && ( !cu_sbt_flag ) ) {
      if( sps_transform_skip_enabled_flag && !BdpcmFlag[ x0 ][ y0 ] &&
          tbWidth <= MaxTsSize && tbHeight <= MaxTsSize )
        transform_skip_flag[ x0 ][ y0 ]
      if( ( ( CuPredMode[ chType ][ x0 ][ y0 ] = = MODE_INTER &&
          sps_explicit_mts_inter_enabled_flag )
          | |( CuPredMode[ chType ][ x0 ][ y0 ] = = MODE_INTRA &&
          sps_explicit_mts_intra_enabmled_flag ) ) && ( !transform_skip_flag[ x0 ][ y0 ] ) )
        tu_mts_idx[ x0 ][ y0 ]
    }
    if( tu_cbf_luma[ x0 ][ y0 ] ) {
      if( !transform_skip_flag[ x0 ][ y0 ] )
        residual_coding( x0, y0, Log2( tbWidth ), Log2( tbHeight ), 0 )
      Else
        residual_ts_coding( x0, y0, Log2( tbWidth ), Log2( tbHeight ), 0 )
    }
    if( tu_cbf_cb<DELETE> [ x0 ][ y0 ] </DELETE> <ADD> [ xC ][ yC ] </ADD> )
      residual_coding( xC, yC, Log2( wC ), Log2( hC ), 1 )
    if( tu_cbf_cr<DELETE> [ x0 ][ y0 ] </DELETE> <ADD> [ xC ][ yC ] </ADD> &&
        !( tu_cbf_cb<DELETE> [ x0 ][ y0 ] </DELETE> <ADD> [ xC ][ yC ] </ADD> &&
tu_joint_cbcr_residual_flag[ x0 ][ y0 ] )) {
      residual_coding( xC, yC, Log2( wC ), Log2( hC ), 2)
    }
  }
}
```

In some examples, video encoder 200 may set the indices of a syntax element, such as tu_joint_cbcr_residual_flag[ ][ ], to xC and yC instead of x0 and y0. This may be reflected in the syntax table, Table 9, above and in corresponding locations in the standard specification.

In other examples, the variables TuCbfCb and TuCbfCr may be used and the syntax elements tu_cbf_cb and tu_cbf_cr may still be signaled along with the last intra sub-partition.

In another example, the tu_cbf_cb and tu_cbf_cr syntax elements may be signaled by video encoder 200 with the first intra sub-partition, but the corresponding residuals may be signaled in the last intra sub-partition. The syntax structure may be similar as above except when the residual coding structure is invoked as follows in Table 10. Additions are shown between <ADD> and </ADD>. Deletions are shown between <DELETE> and </DELETE>.

TABLE 10

```
...
      <ADD> chromaResidualParseFlag = IntraSubPartitionsSplitType = = ISP_NO_SPLIT ||
          ( IntraSubPartitionsSplitType != ISP_NO_SPLIT &&
          subTuIndex = = NumIntraSubPartitions − 1) </ADD>
      if( tu_cbf_cb <DELETE> [ x0 ][ y0 ] </DELETE> <ADD> [ xC ][ yC ] &&
chromaResidualParseFlag) </ADD>
        residual_coding( xC, yC, Log2( wC ), Log2( hC ), 1 )
      if( tu_cbf_cr <DELETE> [ x0 ][ y0 ] <DELETE> <ADD> [ xC ][ yC ] </ADD> &&
        !( tu_cbf_cb <DELETE> [ x0 ][ y0 ] < /DELETE> <ADD> [ xC ][ yC ] </ADD> &&
tu_joint_cbcr_residual_flag[ x0 ][ y0 ] ) <ADD> && chromaResidualParseFlag </ADD>) {
        residual_coding( xC, yC, Log2( wC ), Log2( hC ), 2 )
      }
    }
```

In some examples, signaling of other syntax elements (chroma QP offset, joint Cb-Cr flag, etc.) may also be conditioned on the chromaResidualParseFlag.

In a further example, some examples above may be combined as follows:

TABLE 11

```
    }
    <ADD> useChromaCbfForLumaDeltaQpFlag = treeType = = SINGLE_TREE ||
          IntraSubPartitionsSplitType = = ISP_NO_SPLIT </ADD>
    if( ( CbWidth[ chType ][ x0 ][ y0 ] > 64 | | CbHeight[ chType ][ x0 ][ y0 ] > 64 | |
        tu_cbf_luma[ x0 ][ y0 ] | | <ADD> ( useChromaCbfForLumaDeltaQpFlag &&
        ( </ADD> tu_cbf_cb[ x0 ][ y0 ] | | tu_cbf_cr[ x0 ][ y0 ] <ADD> ) ) </ADD>) &&
        treeType != DUAL_TREE_CHROMA ) {
        if( cu_qp_delta_enabled_flag && !IsCuQpDeltaCoded ) {
            cu_qp_delta_abs                                                 ae(v)
            if( cu_qp_delta_abs )
                cu_qp_delta_sign_flag                                       ae(v)
        }
    }
    if( ( tu_cbf_cb[ x0 ][ y0 ] | | tu_cbf_cr[ x0 ][ y0 ] ) {
```

In another example, the parsing of the chroma residual syntax elements is only applied for certain cases where the chroma syntax elements are not dependent on luma signaling or where chroma CBFs from which a luma CBF depends may have been parsed. For example, video decoder 300 may only parse the chroma residual syntax elements when video decoder 300 has parsed the chroma syntax elements from which a luma CBF depends. For example, video decoder 300 may determine whether chroma CBFs have been parsed and parse, based on the chroma CBFs having been parsed and values of the chroma CBFs, chroma residual syntax elements. In some examples, a luma CBF may be dependent on values of the chroma CBFs. In some examples, video encoder 200 or video decoder 300 may determine whether a TU of a dual tree coded CTU is based on two TBs of chroma samples, and refrain, based on the TU being based on two TBs of chroma samples, from signaling or parsing a luma residual. The changes to the syntax structure and semantics are set forth in Table 12 below. Additions are shown between <ADD> and </ADD>. Deletions are in shown between <DELETE> and </DELETE>.

TABLE 12

| | Descriptor |
|---|---|
| transform_unit( x0, y0, tbWidth, tbHeight, treeType, subTuIndex, chType) { <br>    <ADD> If ( IntraSubPartitionsSplitType != ISP_NO_SPLIT && <br>       treeType = = SINGLE_TREE && subTuIndex = = NumIntraSubPartitions - 1 ) ) <br>       xC = CbPosX[ chType ][ x0 ][ y0 ] <br>       yC = CbPosY[ chType ][ x0 ][ y0 ] <br>       wC = CbWidth[ chType ][ x0 ][ y0 ] / SubWidthC <br>       hC = CbHeight[ chType ][ x0 ][ y0 ] / SubHeightC <br>    } else <br>       xC = x0 <br>       yC = y0 <br>       wC = tbWidth / SubWidthC <br>       hC = tbHeight / SubHeightC <br>    } <br>    chromaAvailable = ( treeType != DUAL_TREE_LUMA ) && ( IntraSubPartitionsSplitType <br> = = ISP_NO_SPLIT | | ( IntraSubPartitionsSplitType != ISP_NO_SPLIT && <br>       (subTuIndex = = NumIntraSubPartitions - 1 ) ) && ChromaArrayType != 0 ) <br> </ADD> <br>    if( ( treeType = = SINGLE_TREE | | treeType = = DUAL_TREE_CHROMA ) && <br>       ChromaArrayType != 0 ) { <br>       if( ( IntraSubPartitionsSplitType = = ISP_NO_SPLIT && !( cu_sbt_flag && <br>          ( ( subTuIndex = = 0 && cu_sbt_pos_flag ) | | <br>          (subTuIndex = = 1 && !cu_sbt_pos_flag ) ) ) ) | | <br>         ( IntraSubPartitionsSplitType != ISP_NO_SPLIT && <br>         (subTuIndex = = NumIntraSubPartitions - 1 ) ) ) { <br>         tu_cbf_cb[ x <ADD> C </ADD> <DELETE> 0 </DELETE>][ y <ADD> C </ADD> <DELETE> 0 </DELETE>] | ae(v) |
|         tu_cbf_cr[ x <ADD> C </ADD> <DELETE> 0 </DELETE>][ y <ADD> C </ADD> <DELETE> 0 </DELETE>] | ae(v) |
|       } <br>    } <br>    if( treeType = = SINGLE_TREE | | treeType = = DUAL_TREE_LUMA ) { <br>       if( ( IntraSubPartitionsSplitType = = ISP_NO_SPLIT && !( cu_sbt_flag && <br>         ( ( subTuIndex = = 0 && cu_sbt_pos_flag ) | | <br>         ( subTuIndex = = 1 && !cu_sbt_pos_flag ) ) ) && <br>        ( CuPredMode[ chType ][ x0 ][ y0 ] = = MODE_INTRA | | <br>         <ADD> ( chromaAvailable && ( </ADD> tu_cbf_cb[ x <ADD> C </ADD> <DELETE> 0 </DELETE>][ y <ADD> C </ADD><DELETE> 0 </DELETE>] | | <br>        tu_cbf_cr[ x <ADD> C </ADD> <DELETE> 0 </DELETE>][ y <ADD> C </ADD> | |

TABLE 12-continued

| | Descriptor |
|---|---|
| <DELETE> 0 </DELETE>] <ADD> ) ) </ADD>\|\|<br>    CbWidth[ chType ][ x0 ][ y0 ] > MaxTbSizeY \|\|<br>    CbHeight[ chType ][ x0 ][ y0 ]> MaxTbSizeY ) ) \|\|<br>  ( IntraSubPartitionsSplitType != ISP_NO_SPLIT &&<br>  ( subTuIndex < NumIntraSubPartitions – 1 \| \| !InferTuCbfLuma ) ) )<br>    tu_cbf_luma[ x0 ][ y0 ] | ae(v) |
|   if (IntraSubPartitionsSplitType != ISP_NO_SPLIT )<br>    InferTuCbfLuma = InferTuCbfLuma && !tu_cbf_luma[ x0 ][ y0 ]<br>}<br><DELETE> if( IntraSubPartitionsSplitType != ISP_NO_SPLIT &&<br>  treeType = = SINGLE_TREE && subTuIndex = = NumIntraSubPartitions – 1 ) )<br>  xC = CbPosX[ chType ][ x0 ][ y0 ]<br>  yC = CbPosY[ chType ][ x0 ][ y0 ]<br>  wC = CbWidth[ chType ][ x0 ][ y0 ] / SubWidthC<br>  hC = CbHeight[ chType ][ x0 ][ y0 ] / SubHeightC<br>} else<br>  xC = x0<br>  yC = y0<br>  wC = tbWidth / SubWidthC<br>  hC = tbHeight / SubHeightC<br>} </DELETE><br>if( ( CbWidth[ chType ][ x0 ][ y0 ] > 64 \|\| CbHeight[ chType ][ x0 ][ y0 ] > 64 \|\|<br>  tu_cbf_luma[ x0 ][ y0 ] \|\| <ADD> ( chromaAvailable && ( </ADD> tu_cbf_cb[ x<br><ADD> C </ADD> <DELETE> 0 </DELETE>][ y <ADD> C </ADD> <DELETE> 0<br></DELETE>] \|\| tu_cbf_cr[ x <ADD> C </ADD> <DELETE> 0 <DELETE>][ y <ADD> C<br></ADD> <DELETE> 0 </DELETE>] ) <ADD> ) ) </ADD>_ &&<br>  treeType != DUAL_TREE_CHROMA ) {<br>  if( cu_qp_delta_enabled_flag && !IsCuQpDeltaCoded ) {<br>    cu_qp_delta_abs | ae(v) |
|     if( cu_qp_delta_abs )<br>      cu_qp_delta_sign_flag | ae(v) |
|   }<br>}<br>if( ( tu_cbf_cb[ x <ADD> C </ADD> <DELETE> 0 </DELETE>][ y <ADD> C </ADD><br><DELETE> 0 </DELETE>] \|\| tu_cbf_cr[ x <ADD> C </ADD> <DELETE> 0<br></DELETE>][ y <ADD> C </ADD> <DELETE> 0 </DELETE>] ) <ADD> &&<br>chromaAvailable </ADD>) {<br>  if( cu_chroma_qp_offset_enabled_flag && !IsCuChromaQpOffsetCoded) {<br>    cu_chroma_qp_offset_flag | ae(v) |
|     if( cu_chroma_qp_offset_flag && chroma_qp_offset_list_len_minus1 > 0)<br>      cu_chroma_qp_offset_idx | ae(v) |
|   }<br>}<br>if( sps_joint_cbcr_enabled_flag && ( ( CuPredMode[ chType ][ x0 ][ y0 ] = =<br>MODE_INTRA<br>  && ( tu_cbf_cb[ x <ADD> C </ADD> <DELETE> 0 </DELETE>][ y <ADD> C<br></ADD> <DELETE> 0 </DELETE>] \|\| tu_cbf_cr[ x <ADD> C </ADD> <DELETE> 0<br></DELETE>][ y <ADD> C </ADD> <DELETE> 0 </DELETE>] ) ) \|\|<br>  ( tu_cbf_cb[ x <ADD> C </ADD> <DELETE> 0 </DELETE>][ y <ADD> C </ADD><br><DELETE> 0 </DELETE>] && tu_cbf_cr[ x <ADD> C </ADD> <DELETE> 0<br></DELETE>][ y <ADD> C </ADD> <DELETE> 0 </DELETE>] ) ) <ADD> &&<br>chromaAvailable </ADD>)<br>  tu_joint_cbcr_residual_flag[ x <ADD> C </ADD> <DELETE> 0 </DELETE>][ y<br><ADD> C </ADD> <DELETE> 0 </DELETE>] | ae(v) |
|   if( tu_cbf_luma[ x0 ][ y0 ] && treeType != DUAL_TREE_CHROMA<br>  && ( tbWidth <= 32 ) && ( tbHeight <= 32 )<br>  && ( IntraSubPartitionsSplit[ x0 ][ y0 ] = = ISP_NO_SPLIT ) && ( !cu_sbt_flag ) ) {<br>    if( sps_transform_skip_enabled_flag && !BdpcmFlag[ x0 ][ y0 ] &&<br>    tbWidth <= MaxTsSize && tbHeight <= MaxTsSize )<br>      transform_skip_flag[ x0 ][ y0 ] | ae(v) |
|     if( ( ( CuPredMode [ chType ][ x0 ][ y0 ] = = MODE_INTER &&<br>    sps_explicit_mts_inter_enabled_flag )<br>    \| \| ( CuPredMode[ chType ][ x0 ][ y0 ] = = MODE_INTRA &&<br>    sps_explicit_mts_intra_enabled_flag ) ) && ( !transform_skip_flag[ x0 ][ y0 ] ) )<br>      tu_mts_idx[ x0 ][ y0 ] | ae(v) |
|   }<br>  if( tu_cbf_luma[ x0 ][ y0 ] <ADD> && treeType != DUAL_TREE_CHROMA </ADD>) {<br>    if( !transform_skip_flag[ x0 ][ y0 ] )<br>      residual_coding( x0, y0, Log2( tbWidth), Log2( tbHeight ), 0 )<br>    Else<br>      residual_ts_coding( x0, y0, Log2( tbWidth ), Log2( tbHeight ), 0 )<br>  }<br>  if( tu_cbf_cb[ x <ADD> C </ADD> <DELETE> 0 </DELETE>][ y <ADD> C </ADD><br><DELETE> 0 </DELETE> <ADD> && chromaAvailable </ADD>)<br>    residual_coding( xC, yC, Log2( wC ), Log2( hC ), 1 )<br>  if( tu_cbf_cr[ x <ADD> C </ADD> <DELETE> 0 </DELETE>][ y <ADD> C </ADD><br><DELETE> 0 </DELETE>] &&<br>  !( tu_cbf_cb[ x <ADD> C </ADD> <DELETE> 0 </DELETE>][ y <ADD> C </ADD> | |

TABLE 12-continued

Descriptor

```
<DELETE> 0 </DELETE>] && tu_joint_cbcr_residual_flag[ x <ADD> C </ADD>
<DELETE> 0 </DELETE>][ y <ADD> C </ADD> <DELETE> 0 </DELETE>] ) <ADD>
&& chromaAvailable </ADD>) {
    residual_coding( xC, yC, Log2( wC ), Log2( hC ), 2 )
  }
}
```

Changes to the semantics in VVC Draft 6 may be as follows. Deletions are shown between <DELETE> and </DELETE>.

tu_cbf_cb[x0][y0] equal to 1 specifies that the Cb transform block contains one or more transform coefficient levels not equal to 0. The array indices x0, y0 specify the top-left location (x0, y0) of the considered transform block.

When tu_cbf_cb[x0][y0] is not present <DELETE> in the current TU </DELETE>, its value is inferred to be equal to 0. In one example, when tu_cbf_cb is not signaled in an instance of the syntax structure transform_unit( ), the value may be inferred to be 0.

tu_cbf_cr[x0][y0] equal to 1 specifies that the Cr transform block contains one or more transform coefficient levels not equal to 0. The array indices x0, y0 specify the top-left location (x0, y0) of the considered transform block.

When tu_cbf_cr[x0][y0] is not present <DELETE> in the current TU </DELETE>, its value is inferred to be equal to 0. In one example, when tu_cbf_cr is not signaled in an instance of the syntax structure transform_unit( ), the value may be inferred to be 0.

tu_cbf_luma[x0][y0] equal to 1 specifies that the luma transform block contains one or more transform coefficient levels not equal to 0. The array indices x0, y0 specify the location (x0, y0) of the top-left luma sample of the considered transform block relative to the top-left luma sample of the picture.

When tu_cbf_luma[x0][y0] is not present <DELETE> in the current TU </DELETE>, its value is inferred as follows:

If cu_sbt_flag is equal to 1 and one of the following conditions is true, tu_cbf_luma[x0][y0] is inferred to be equal to 0: subTuIndex is equal to 0 and cu_sbt_pos_flag is equal to 1; or subTuIndex is equal to 1 and cu_sbt_pos_flag is equal to 0. Otherwise, tu_cbf_luma[x0][y0] is inferred to be equal to 1.

For example, video decoder 300 may determine whether a CBF is present, and infer, based on the CBF not being present, the CBF to be zero. In some examples, the CBF may be a chroma CBF, such as tu_cbf_cb[x0][y0] or tu_cbf_cr [x0][y0]. In some examples, the CBF may be a luma CBF, such as tu_cbf_luma[x0][y0].

Figure 5:
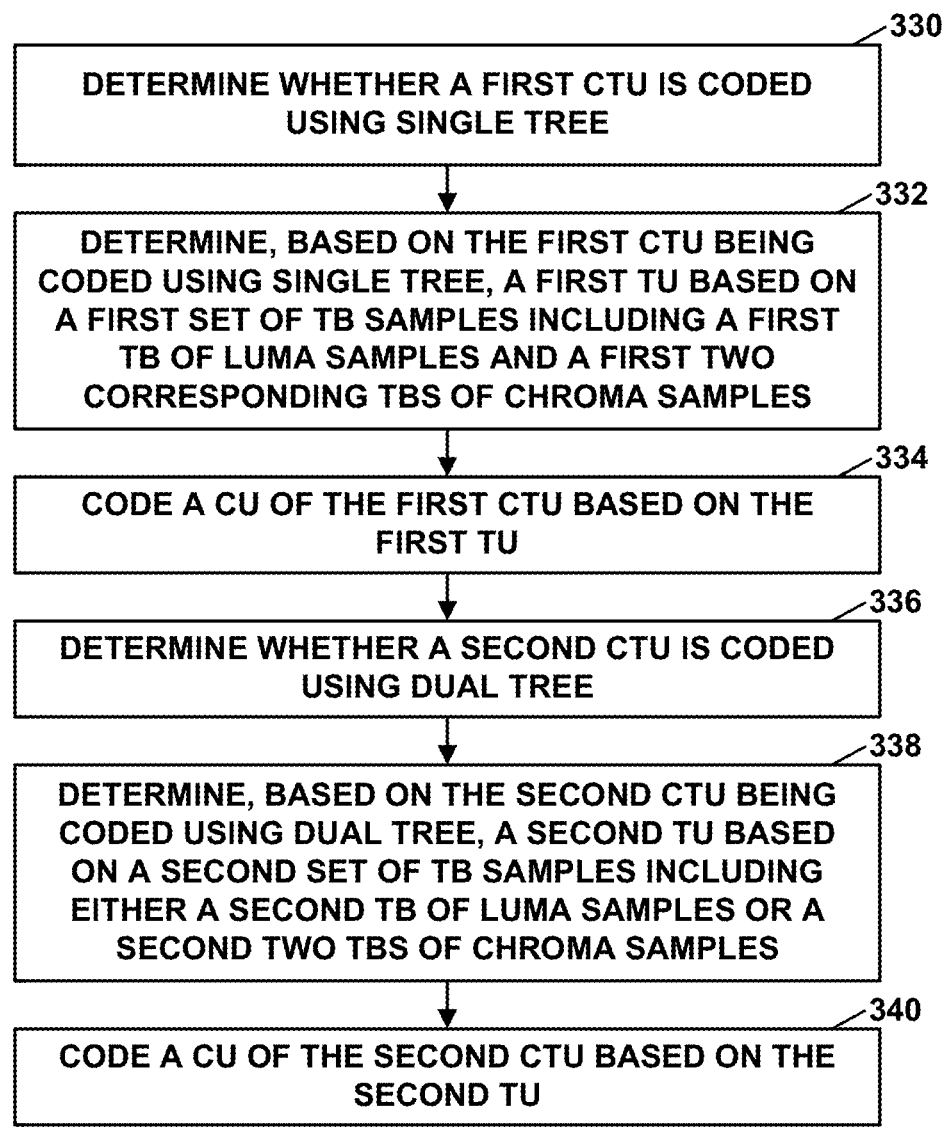
FIG. 5 is a flowchart illustrating techniques for determining transform units (TUs) according to the techniques of this disclosure.

FIG. 5 is a flowchart illustrating techniques for determining transform units (TUs) according to the techniques to this disclosure. Video encoder 200 or video decoder 300 may determine whether a first CTU is coded using single tree (330). For example, video encoder 200 may determine to code a first CTU in single tree and signal a syntax element to video decoder 300 indicative of the first CTU being coded in single tree. Video decoder 300 may parse the syntax element to determine the first CTU is encoded using single tree.

Video encoder 200 (e.g., transform processing unit 206) or video decoder 300 (e.g., inverse transform processing unit 308) may determine, based on the first CTU being coded using single tree, a first TU based on a first set of TB samples including a first TB of luma samples and a first two corresponding TBs of chroma samples (332). For example, video encoder 200 or video decoder 300 may determine a first TU that includes a first TB of luma samples and a first two corresponding TBs of chroma samples.

Video encoder 200 or video decoder 300 may code a CU of the first CTU based on the first TU (334). For example, video encoder 200 may encode the CU of the first CTU based on the first TU and video decoder 300 may decode the CU of the first CTU based on the first TU.

Video encoder 200 or video decoder 300 may determine whether a second CTU is coded using dual tree (336). For example, video encoder 200 may determine to code a second CTU in dual tree and signal a syntax element to video decoder 300 indicative of the second CTU being coded in dual tree. Video decoder 300 may parse the syntax element to determine the second CTU is encoded using dual tree.

Video encoder 200 (e.g., transform processing unit 206) or video decoder 300 (e.g., inverse transform processing unit 308) may determine, based on the second CTU being coded using dual tree, a second TU based on a second set of TB samples including either (i) a second TB of luma samples or (ii) a second two TBs of chroma samples (338). For example, video encoder 200 or video decoder 300 may determine a second TU that includes either a second TB of luma samples or a second two TBs of chroma samples.

Video encoder 200 or video decoder 300 may code a CU of the second CTU based on the second TU (340). For example, video encoder 200 may encode the CU of the second CTU based on the second TU and video decoder 300 may decode the CU of the second CTU based on the second TU.

In some examples, video encoder 200 or video decoder 300 may initialize, based on the second CTU being coded using dual tree, chroma CBF values to zero at a beginning of a luma tree. In some examples, video decoder 300 may determine whether a CBF is present and, based on the CBF not being present, infer the CBF to be zero. In some examples, the CBF is a chroma CBF. In some examples, the CBF is a luma CBF.

In some examples, video decoder 300 may determine whether chroma CBFs have been parsed and parse, based on the chroma CBFs having been parsed and values of the chroma CBFs, chroma residual syntax elements. In some examples, a luma CBF is dependent on values of the chroma CBFs.

In some examples, video encoder 200 or video decoder 300 may determine whether the second TU is based on the second two TBs of chroma samples and may refrain, based on the second TU being based on the second two TBs of chroma samples, from signaling or parsing a luma residual.

In some examples, video encoder 200 or video decoder 300 may determine whether a third CTU is coded using single tree. Video encoder 200 or video decoder 300 may determine whether the third CTU is coded using intra-sub partitions. Based on the third CTU being coded using single tree and intra-sub partitions, video encoder 200 or video decoder 300 may determine a third TU based on a third set of TB samples including a third TB of luma samples and a fourth TU based on a fourth set of TB samples including a fourth TB of luma samples and a fourth two corresponding TBs of chroma samples. Video encoder 200 or video decoder 300 may code a CU of the third CTU based on the third TU and the fourth TU.

Figure 6:
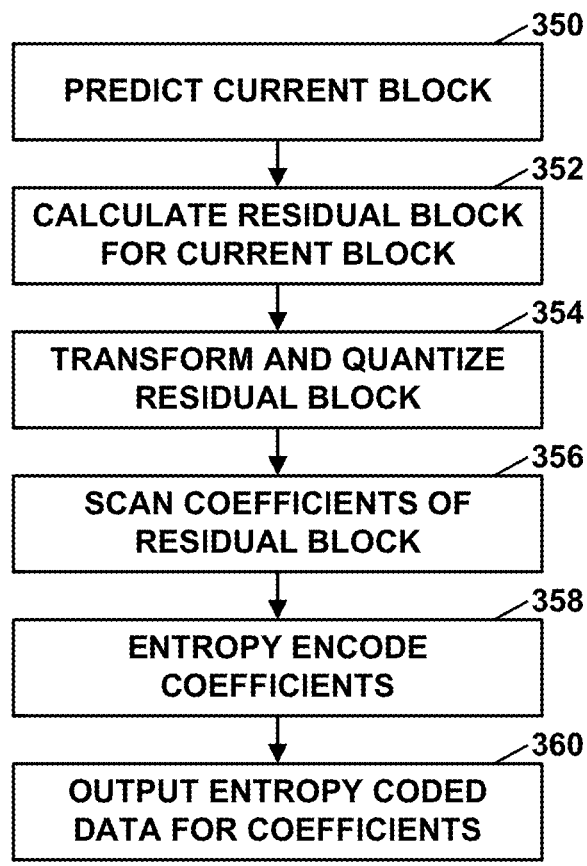
FIG. 6 is a flowchart illustrating a method of encoding video data according to techniques of this disclosure.

FIG. 6 is a flowchart illustrating an example method for encoding a current block. The current block may comprise a current CU. Although described with respect to video encoder 200 (FIGS. 1 and 3), it should be understood that other devices may be configured to perform a method similar to that of FIG. 6.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). In some examples, video encoder 200 may determine whether a first CTU is coded using single tree and determine, based on the first CTU being coded using single tree, a first TU based on a first set of TB samples including a first TB of luma samples and a first two corresponding TBs of chroma samples. Additionally, or alternatively, video encoder 200 may determine whether a second CTU is coded using dual tree and determine, based on the second CTU being coded using dual tree, a second TU based on a second set of TB samples including either (i) a second TB of luma samples or (ii) a second two TBs of chroma samples.

Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 7:
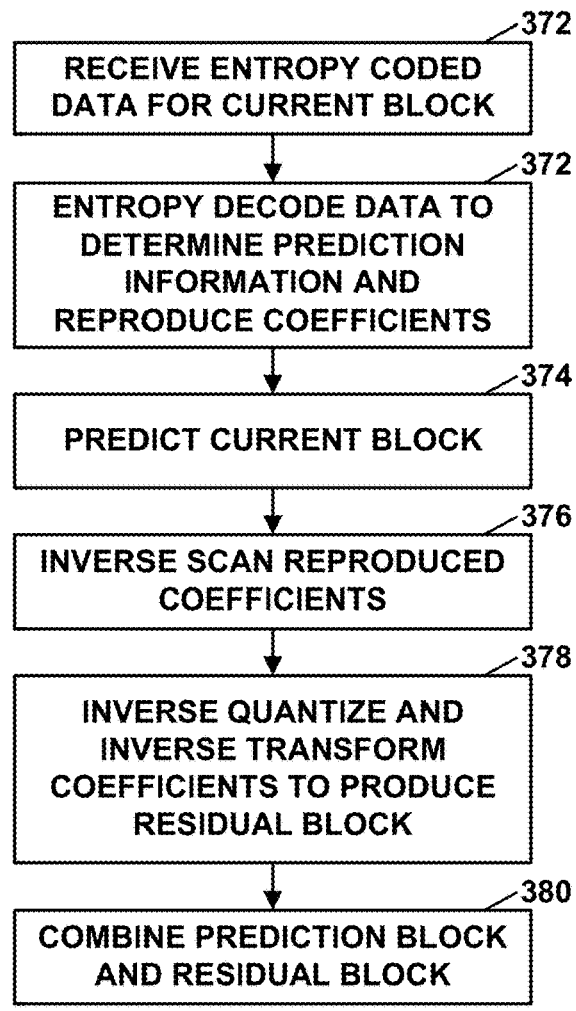
FIG. 7 is a flowchart illustrating a method of decoding video data according to techniques of this disclosure.

FIG. 7 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 7.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the transform coefficients to produce a residual block (378). In some examples, video decoder 300 may determine whether a first CTU is coded using single tree and determine, based on the first CTU being coded using single tree, a first TU based on a first set of TB samples, including a first TB of luma samples and a first two corresponding TBs of chroma samples. Additionally, or alternatively, video decoder 300 may determine whether a second CTU is coded using dual tree and determine, based on the second CTU being coded using dual tree, a second TU based on a second set of TB samples, including either (i) a second TB of luma samples or (ii) a second two TBs of chroma samples.

Video decoder 300 may ultimately decode the current block by combining the prediction block and the residual block (380).

This disclosure includes the following examples.

Example 1. A method of coding video data, the method comprising: determining, by one or more processors, whether a first coding tree unit (CTU) is coded using single tree; determining, by one or more processors and based on the first CTU being coded using single tree, a first transform unit (TU) based on a first set of transform block (TB) samples comprising a first TB of luma samples and a first two corresponding TBs of chroma samples; coding a coding unit (CU) of the first CTU based on the first TU; determining, by the one or more processors, whether a second CTU is coded using dual tree; determining, by one or more processors and based on the second CTU being coded using dual tree, a second TU based on a second set of TB samples comprising either (i) a second TB of luma samples or (ii) a second two TBs of chroma samples; and coding a CU of the second CTU based on the second TU, wherein the first TU comprises syntax structures used to transform first set of TB samples and the second TU comprises syntax structures used to transform second set of TB samples.

Example 2. The method of example 1, further comprising: initializing, by one or more processors and based on the second CTU being coded using dual tree, chroma coded block flag (CBF) values to zero at a beginning of a luma tree.

Example 3. The method of any combination of examples 1-2, further comprising: determining, by the one or more processors, whether a CBF is present; inferring, by the one or more processors and based on the CBF not being present, the CBF to be zero.

Example 4. The method of example 3, wherein the CBF comprises a chroma CBF.

Example 5. The method of example 3, wherein the CBF comprises a luma CBF.

Example 6. The method of any combination of examples 1-5, further comprising: determining, by the one or more processors, whether chroma CBFs have been parsed; and parsing, by the one or more processors and based on the chroma CBFs having been parsed and values of the chroma CBFs, chroma residual syntax elements.

Example 7. The method of any combination of examples 1-6 further comprising: determining, by the one or more processors, whether the second TU is based on the second two TBs of chroma samples; and refraining, by the one or more processors and based on the second TU being based on the second two TBs of chroma samples, from signaling or parsing a luma residual.

Example 8. A method of coding video data, the method comprising: determining whether a coding tree unit (CTU) is being coded using single tree or dual tree; if the CTU is being coded using single tree, determining a transform unit (TU) based on a transform block (TB) of luma samples and two corresponding TBs of chroma samples; if the CTU is being coded using dual tree, determining the TU based on the TB of luma samples or two corresponding TBs of chroma samples; and coding the video data based on the TU.

Example 9. A method of coding video data, the method comprising: determining whether intra sub-partitioning (ISP) is applied to a coding block containing samples;

determining whether the coding block is being coded using single tree or dual tree; if the coding block is being coded using single tree and ISP is not applied, determining a TU based on a TB of luma samples and two corresponding TBs of chroma samples; if the coding block is being coded using single tree and ISP is applied, determining a TU based on a TB of luma samples for a first N−1 luma TBs, one luma TB and two TBs of chroma samples, wherein the chroma samples may correspond to more than TBs in the coding block; if the coding block is being coded using dual tree, determining the TU based on the TB of luma samples or two corresponding TBs of chroma samples; and coding the video data based on the TU.

Example 10. A method of coding video data, the method comprising: determining whether a coding block is being coded using single tree or dual tree; if the coding block is being coded using dual tree, signaling or parsing a delta quantization parameter (QP) without regard to chroma coded block flag (CBF) values; and coding the video data based upon the delta QP.

Example 11. The method of example 10, further comprising: if the coding block is being coded using single tree, signaling or parsing the delta QP without regard to chroma CBF values.

Example 12. A method of coding video data, the method comprising: determining whether a coding block is being coded using dual tree; if the coding block is being coded using dual tree, initializing chroma CBF values to zero at a beginning of a luma tree; and coding the video data based on chroma CBF values.

Example 13. A method of coding video data, the method comprising: determining whether ISP is applied for a coding block; if ISP is applied for the coding block, signaling tu_cbf values for chroma in a first intra sub-partition and signaling a residual associated with chroma in the first intra sub-partition; and coding the video data based upon the tu_cbf values and the residual.

Example 14. The method of example 13, further comprising modifying indices of tu_joint_cbcr_residual_flag[ ][ ] to xC and yC rather than x0 and y0.

Example 15. A method of coding video data, the method comprising: determining whether ISP is applied for a coding block; if ISP is applied for the coding block, signaling tu_cbf values for chroma in a first intra sub-partition and signaling a residual associated with chroma in a last intra sub-partition; and coding the video data based upon the tu_cbf values and the residual.

Example 16. The method of example 15, further comprising: if ISP is applied for the coding block, signaling tu_cbf values for luma in the first intra sub-partition and signaling a residual associated with luma in a last intra sub-partition.

Example 17. A method of coding video data, the method comprising: determining whether ISP is enabled for a coding block; determining whether chroma tools are dependent on reconstructed luma values for the coding block; if ISP is enabled and chroma tools are dependent on reconstructed luma values, disabling chroma tools for the coding block; and coding the video block based on the determinations.

Example 18. A method of coding video data, the method comprising: determining whether tu_cbr_cr and tu_cbr_cb are present in a current TU; if tu_cbr_cr is not present in the current TU, not inferring tu_cbr_cr to be zero; if tu_cbr_cb is not present in the current TU, not inferring tu_cbr_cb to be zero; and coding the video data based upon tu_cbr_cr and tu_cbr_cb.

Example 19. The method of example 18, further comprising: initializing TuCfbCb and TuCbfCr to zero; if tu_cbr_cr is present, setting TuCbfCr to equal tu_cbr_cr; and if tu_cbr_cb is present, setting TuCfbCb to equal tu_cbr_cb.

Example 20. The method of example 18 or 19, further comprising: signaling tu_cbr_cr and tu_cbr_cb in a last intra sub-partition.

Example 21. A method of coding video data, the method comprising: determining whether a coding block is being coded using single tree or dual tree; only if the coding block is being coded using single tree, parsing tu_cbr_cr and tu_cbr_cb; and coding the video data based on tu_cbr_cr and tu_cbr_cb.

Example 22. A device for coding video data, the device comprising one or more means for performing the method of any of examples 1-21.

Example 23. The device of example 22, wherein the one or more means comprise one or more processors implemented in circuitry.

Example 24. The device of examples 22 or 23, further comprising a memory to store the video data.

Example 25. The device of any combination of examples 22-24, further comprising a display configured to display decoded video data.

Example 26. The device of any combination of examples 22-25, wherein the device comprises one or more of a camera, a computer, a mobile device, a broadcast receiver device, or a set-top box.

Example 27. The device of any combination of examples 22-26, wherein the device comprises a video decoder.

Example 28. The device of any combination of examples 22-27, wherein the device comprises a video encoder.

Example 29. A computer-readable storage medium having stored thereon instructions that, when executed, cause one or more processors to perform the method of any of examples 1-21.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
determining, by one or more processors, that a first coding tree unit (CTU) is coded using single tree partitioning;
determining, by the one or more processors and based on the first CTU being coded using single tree partitioning, a first transform unit (TU) based on a first set of transform block (TB) samples comprising a first TB of luma samples and a first two corresponding TBs of chroma samples;
coding, by the one or more processors, a coding unit (CU) of the first CTU based on the first TU;
determining, by the one or more processors, that a second CTU is coded using dual tree luma partitioning;
determining, by the one or more processors and based on the second CTU being coded using dual tree luma partitioning, a second TU based on a second set of TB samples comprising a second TB of luma samples;
initializing, by the one or more processors and based on the second CTU being coded using dual tree luma partitioning, chroma coded block flag (CBF) values to zero at a beginning of a luma tree; and
coding, by the one or more processors, a CU of the second CTU based on the second TU,
wherein the first TU comprises syntax structures used to transform the first set of TB samples and the second TU comprises syntax structures used to transform the second set of TB samples.

2. The method of claim 1, further comprising:
determining, by the one or more processors, that a first CBF is not present; and
inferring, by the one or more processors and based on the CBF not being present, the CBF to be zero.

3. The method of claim 2, wherein the first CBF comprises a chroma CBF.

4. The method of claim 2, wherein the first CBF comprises a luma CBF.

5. The method of claim 1, further comprising:
determining, by the one or more processors, that chroma CBFs for a third CTU have been parsed; and
parsing, by the one or more processors and based on the chroma CBFs for the third CTU having been parsed and values of the chroma CBFs, chroma residual syntax elements.

6. The method of claim 1, further comprising:
determining, by the one or more processors, that the second set of TB samples comprise the second two TBs of chroma samples; and
refraining, by the one or more processors and based on the second set of TB samples comprising the second two TBs of chroma samples, from coding a luma residual.

7. The method of claim 1, wherein coding comprises encoding.

8. The method of claim 1, wherein coding comprises decoding.

9. The method of claim 1, further comprising:
determining, by the one or more processors, that a third CTU is coded using single tree partitioning;
determining, by the one or more processors, that the third CTU is coded using intra-sub partitions;
determining, by the one or more processors and based on the third CTU being coded using single tree partitioning and intra-sub partitions, a third TU based on a third set of TB samples comprising a third TB of luma samples and a fourth TU based on a fourth set of TB samples comprising a fourth TB of luma samples and a fourth two corresponding TBs of chroma samples; and
coding, by the one or more processors, a CU of the third CTU based on the third TU and the fourth TU.

10. The method of claim 1, further comprising:
determining, by the one of more processors, a delta quantization parameter based at least in part on the chroma CBF values.

11. The method of claim 1, further comprising:
determining, by the one or more processors, that a third CTU is coded using dual tree chroma partitioning; and
determining, by the one or more processors, a third TU based on a third set of TB samples comprising a second two corresponding TBs of chroma samples.

12. A device for coding video data, the device comprising:
a memory configured to store the video data; and one or more processors implemented in circuitry and communicatively coupled to the memory, the one or more processors being configured to:
- determine that a first coding tree unit (CTU) is coded using single tree partitioning;
- determine, based on the first CTU being coded using single tree partitioning, a first transform unit (TU) based on a first set of transform block (TB) samples comprising a first TB of luma samples and a first two corresponding TBs of chroma samples;
- code a coding unit (CU) of the first CTU based on the first TU;
- determine that a second CTU is coded using dual tree luma partitioning;
- determine, based on the second CTU being coded using dual tree luma partitioning, a second TU based on a second set of TB samples comprising a second TB of luma samples;
- initialize, based on the second CTU being coded using dual tree luma partitioning, chroma coded block flag (CBF) values to zero at a beginning of a luma tree; and
- code a CU of the second CTU based on the second TU,
- wherein the first TU comprises syntax structures used to transform the first set of TB samples and the second TU comprises syntax structures used to transform the second set of TB samples.

13. The device of claim 12, wherein the one or more processors are further configured to:
- determine that a first CBF is not present; and
- infer, based on the first CBF not being present, the CBF to be zero.

14. The device of claim 13, wherein the first CBF comprises a chroma CBF.

15. The device of claim 13, wherein the first CBF comprises a luma CBF.

16. The device of claim 12, wherein the one or more processors are further configured to:
- determine that chroma CBFs for a third CTU have been parsed; and
- parse, based on the chroma CBFs for the third CTU having been parsed and values of the chroma CBFs, chroma residual syntax elements.

17. The device of claim 12, wherein the one or more processors are further configured to:
- determine that the second TB samples comprise the second set of two TBs of chroma samples; and
- refrain, based on the second TB samples comprising the second set of two TBs of chroma samples, from coding a luma residual.

18. The device of claim 12, wherein the device comprises a video encoder.

19. The device of claim 12, wherein the device comprises a video decoder.

20. The device of claim 12, wherein the one or more processors are further configured to:
- determine that a third CTU is coded using single tree partitioning;
- determine that the third CTU is coded using intra-sub partitions;
- determine, based on the third CTU being coded using single tree partitioning and intra-sub partitions, a third TU based on a third set of TB samples comprising a third TB of luma samples and a fourth TU based on a fourth set of TB samples comprising a fourth TB of luma samples and a fourth two corresponding TBs of chroma samples; and
- code a CU of the third CTU based on the third TU and the fourth TU.

21. A non-transitory computer-readable storage medium having instructions stored thereon which, when executed by one or more processors, cause the one or more processors to:
- determine a first coding tree unit (CTU) is coded using single tree partitioning;
- determine, based on the first CTU being coded using single tree partitioning, a first transform unit (TU) based on a first set of transform block (TB) samples comprising a first TB of luma samples and a first two corresponding TBs of chroma samples;
- code a coding unit (CU) of the first CTU based on the first TU;
- determine that a second CTU is coded using dual tree luma partitioning;
- determine, based on the second CTU being coded using dual tree luma partitioning, a second TU based on a second set of TB samples comprising a second TB of luma samples;
- initialize, based on the second CTU being coded using dual tree, chroma coded block flag (CBF) values to zero at a beginning of a luma tree; and
- code a CU of the second CTU based on the second TU,
- wherein the first TU comprises syntax structures used to transform the first set of TB samples and the second TU comprises syntax structures used to transform the second set of TB samples.

22. The non-transitory computer-readable storage medium of claim 21, wherein the instructions further cause the one or more processors to:
- determine that a first CBF is not present;
- infer, based on the first CBF not being present, the CBF to be zero.

23. The non-transitory computer-readable storage medium of claim 22, wherein the first CBF comprises a chroma CBF.

24. The non-transitory computer-readable storage medium of claim 22, wherein the first CBF comprises a luma CBF.

25. The non-transitory computer-readable storage medium of claim 21, wherein the instructions further cause the one or more processors to:
- determine that chroma CBFs for a third CTU have been parsed; and
- parse, based on the chroma CBFs for the third CTU having been parsed and values of the chroma CBFs, chroma residual syntax elements.

26. The non-transitory computer-readable storage medium of claim 21, wherein the instructions further cause the one or more processors to:
- determine that the second set of TB samples comprise the second two TBs of chroma samples; and
- refrain, based on the second set of TB samples comprising the second two TBs of chroma samples, from coding a luma residual.

27. The non-transitory computer-readable storage medium of claim 21, wherein code comprises encode.

28. The non-transitory computer-readable storage medium of claim 21, wherein code comprises decode.

29. The non-transitory computer-readable storage medium of claim 21, wherein the instructions further cause the one or more processors to:
- determine that a third CTU is coded using single tree partitioning;
- determine that the third CTU is coded using intra-sub partitions;

determine, based on the third CTU being coded using single tree partitioning and intra-sub partitions, a third TU based on a third set of TB samples comprising a third TB of luma samples and a fourth TU based on a fourth set of TB samples comprising a fourth TB of luma samples and a fourth two corresponding TBs of chroma samples; and code a CU of the third CTU based on the third TU and the fourth TU.

30. A device for coding video data, the device comprising:

means for determining that a first coding tree unit (CTU) is coded using single tree partitioning;

means for determining, based on the first CTU being coded using single tree partitioning, a first transform unit (TU) based on a first set of transform block (TB) samples comprising a first TB of luma samples and a first two corresponding TBs of chroma samples;

means for coding a coding unit (CU) of the first CTU based on the first TU;

means for determining that a second CTU is coded using dual tree luma partitioning;

means for determining, based on the second CTU being coded using dual tree luma partitioning, a second TU based on a second set of TB samples comprising a second TB of luma samples;

means for initializing, based on the second CTU being coded using dual tree luma partitioning, chroma coded block flag (CBF) values to zero at a beginning of a luma tree; and means for coding a CU of the second CTU based on the second TU, wherein the first TU comprises syntax structures used to transform the first set of TB samples and the second TU comprises syntax structures used to transform the second set of TB samples.

* * * * *